(12) United States Patent
    Lu

(10) Patent No.: US 11,965,757 B2
(45) Date of Patent: Apr. 23, 2024

(54) HYBRID POSITIONING ELECTROMAGNETIC INDUCTION DISPLACEMENT SENSOR

(71) Applicant: Guilin Guanglu Measuring Instrument Co., Ltd., Guangxi (CN)

(72) Inventor: Quhui Lu, Guangxi (CN)

(73) Assignee: GUILIN GUANGLU MEASURING INSTRUMENT CO., LTD., Guangxi (CN)

( * ) Notice: Subject to any disclaimer, the term of this patent is extended or adjusted under 35 U.S.C. 154(b) by 335 days.

(21) Appl. No.: 17/421,331

(22) PCT Filed: Sep. 22, 2020

(86) PCT No.: PCT/CN2020/116882
§ 371 (c)(1),
(2) Date: Jul. 7, 2021

(87) PCT Pub. No.: WO2021/057730
PCT Pub. Date: Apr. 1, 2021

(65) Prior Publication Data
US 2022/0065662 A1    Mar. 3, 2022

(30) Foreign Application Priority Data

Sep. 29, 2019   (CN) .......................... 201910932245.0

(51) Int. Cl.
   *G01D 5/20*      (2006.01)
   *H01F 38/14*     (2006.01)
(52) U.S. Cl.
   CPC .............. *G01D 5/20* (2013.01); *H01F 38/14* (2013.01)

(58) Field of Classification Search
   None
   See application file for complete search history.

(56) References Cited

U.S. PATENT DOCUMENTS

| 5,804,963 A | 9/1998 | Meyer |
| 5,886,519 A | 3/1999 | Masreliez et al. |
| (Continued) | | |

FOREIGN PATENT DOCUMENTS

| CN | 1470847 A | 1/2004 |
| CN | 1553138 A | 12/2004 |
| (Continued) | | |

*Primary Examiner* — Jas A Sanghera
(74) *Attorney, Agent, or Firm* — MUNCY, GEISSLER, OLDS & LOWE, P.C.

(57) ABSTRACT

The electromagnetic induction displacement sensor consists of a transceiver board and an excitation board that may move relative to each other along a measuring path. The transceiver board is arranged with at least one transmitter winding and at least two three-phase receiver windings with different pitches, the number of three-phase receiver windings is one more than that of transmitter windings. Each transmitter winding encircles two three-phase receiver windings with different pitches in the same direction in series, and all receiver windings are in a distributed winding structure. The excitation board is arranged with at least two rows of excitation coils in the shape of short-circuit loop, the number of rows of excitation coils is equal to the number of the three-phase receiver windings on the transceiver board, respectively aligning with corresponding three-phase receiver winding and having the same pitch.

9 Claims, 19 Drawing Sheets

(56) References Cited

U.S. PATENT DOCUMENTS

| | | | | |
|---|---|---|---|---|
| 5,973,494 | A | * 10/1999 | Masreliez | G01D 5/2046 |
| | | | | 324/207.17 |
| 5,998,990 | A | 12/1999 | Andermo et al. | |
| 6,011,389 | A | 1/2000 | Marsreliez et al. | |
| 2009/0195241 | A1 | * 8/2009 | Nakayama | G01D 5/2073 |
| | | | | 324/207.17 |
| 2019/0316936 | A1 | * 10/2019 | Mori | G01D 5/2086 |

FOREIGN PATENT DOCUMENTS

| | | | |
|---|---|---|---|
| CN | 1198111 | C | 4/2005 |
| CN | 100491896 | C | 5/2009 |
| CN | 201787917 | U | 4/2011 |
| CN | 201837401 | U | 5/2011 |
| CN | 103644834 | A | 3/2014 |
| CN | 107796293 | A | 3/2018 |
| CN | 108603768 | A | 9/2018 |
| CN | 110487162 | A | 11/2019 |
| DE | 4311973 | C2 | 9/1997 |
| JP | 2006-112815 | A | 4/2006 |

\* cited by examiner

HYBRID POSITIONING ELECTROMAGNETIC INDUCTION DISPLACEMENT SENSOR

FIELD OF TECHNOLOGY

The present disclosure relates to electromagnetic induction displacement measurement technologies, and in particular, to an electromagnetic induction displacement sensor implemented through a hybrid positioning method.

BACKGROUND

To overcome shortcomings of a capacitive displacement sensor that is sensitive to factors such as dirt and humidity, an electromagnetic induction displacement sensor emerges as the times require.

U.S. Pat. No. 5,804,963 discloses an incremental electromagnetic induction displacement sensor, which completes displacement measurement by cyclically driving three groups of inducting windings and receiving signals from two groups of induced windings that are equivalently orthogonal to the inducting windings being driven. Patent CN100491896C improves structures of the inducting winding and the induced winding in U.S. Pat. No. 5,804,963, such that the inducting conductor (winding) and the induced conductor (winding) are arranged separately without sharing, to reduce direct coupling between them and the measurement method is not changed. Incremental measurement is simple to implement, but it must operate continuously to accumulate displacement increments in real time, such that the operating current is relatively large.

U.S. Pat. No. 5,886,519 discloses an absolute position electromagnetic induction displacement sensor, which deduces a measurement result by sequentially measuring spatial phases of a measured position in multiple different wavelengths. To obtain a spatial phase of the measured position in a certain wavelength: firstly, exciting a transmitter winding of the wavelength in an LC oscillation manner, activating a sample-and-hold (SAH) control signal of a receiver winding signal of the wavelength when oscillating current crosses zero, amplifying a sampled signal and performing analog-to-digital conversion (ADC), and finally figuring out a required phase through the arctangent operation. Patent CN1198111C improves a scale structure and a layout of each transmitter winding in U.S. Pat. No. 5,886,519. The new scale uses multiple interconnected coupling loops to generate positive and negative symmetrical space magnetic fields in a receiver winding area. The measurement method is not changed. The absolute position electromagnetic induction displacement sensor has no minimum measurement frequency requirement, so it can operate intermittently at long intervals with a very small average operating current; the disadvantage is that the limited range restricts its range of application, for example, a slot width of a conventional caliper is only about 12.5 mm which can accommodate at most two wavelength layouts with improved structures. With the current manufacturing technology, the absolute position electromagnetic induction displacement sensor cannot be applied to conventional calipers over 200 mm. In addition, for the hand-held measuring tool powered by button batteries, it is not easy to implement functional parts such as a high-speed comparator, an analog-to-digital converter, and an arctangent operation in its measurement method. Therefore, the manufacturing cost is not low.

SUMMARY

In conclusion, the present disclosure discloses a hybrid positioning electromagnetic induction displacement sensor that may operate intermittently with no range limit and that is easy to implement, to resolve technical shortcomings of the existing electromagnetic induction displacement sensor, such as relatively large operating currents, limited ranges, high production costs, being relatively difficult to manufacture, and the like.

To resolve the technical problems proposed in the present disclosure, the technical solution is adopted as below:

a hybrid positioning electromagnetic induction displacement sensor, where the sensor includes a transceiver board (1) and an excitation board (2) that may move relative to each other along a measuring path;

the transceiver board (1) is arranged with a measurement circuit, at least one transmitter winding extending along the measuring path, and at least two three-phase receiver windings with different pitches, where the number of the receiver windings is one more than that of transmitter windings; each transmitter winding encircles two three-phase receiver windings with different pitches, each three-phase receiver winding includes three phase windings with the same structure and a phase difference of 120° in sequence, both the transmitter winding and the three-phase receiver winding being connected to the measurement circuit; the measurement circuit includes a central control unit, an interface unit, and a measurement unit, the central control unit including a microcontroller (13), and the interface unit including a key input circuit, a liquid crystal drive circuit, a measurement interface circuit, and a power source conversion circuit that are connected to the microcontroller (13); and the excitation board (2) is arranged with at least two rows of excitation coils that extend along the measuring path, where the number of excitation coils is equal to that of the three-phase receiver windings on the transceiver board (1), each row of excitation coil and a corresponding three-phase receiver winding on the transceiver board (1) have the same pitch and coincided center lines respectively, and a length along the measuring path is half of a respective pitch.

As a further definition, the technical solution of the present disclosure includes:

the measurement unit includes an oscillator, a frequency dividing circuit (3), a signal generator consisting of a driving and sampling pulse forming circuit (4) and a line voltage scanning control signal generator (5), an analog signal processing circuit consisting of an analog switch group (6), sample-and-hold capacitors ($C_1$, $C_2$), a differential amplifier (7), a low-pass filter (8), and a zero-crossing detector (9), a phase quantization circuit consisting of a synchronous delay circuit, an up counter (10), random access memories (11, 12) and a synchronous capture circuit, and transmitter winding drive power tubes ($T_1$, $T_2$), two sets of analog signal processing circuits, random access memories, and synchronous capture circuits being respectively arranged to form two parallel processing channels; and the oscillator provides an input clock for the driving and sampling pulse forming circuit (4), the line voltage scanning control signal generator (5), the low-pass filter (8), the synchronous capture circuit and the up counter (10) directly or through the frequency dividing circuit (3); in addition to connecting to the analog switch group (6), the driving and sampling pulse forming circuit (4) is connected to the transmitter winding drive power tubes ($T_1$, $T_2$) directly or through a multiway switch ($S_{14}$), and the line voltage scanning control signal generator (5) is separately connected to the analog switch group (6) and the synchronous delay circuit; the analog switch group (6), the differential amplifier (7), the low-pass filter (8), the zero-crossing detector (9), the synchronous capture circuit are connected in sequence, and the sample-and-hold capacitors ($C_1$, $C_2$) are connected between an input end of the differential amplifier (7) and the analog signal ground; the synchronous delay circuit is separately connected to the synchronous capture circuit and the up counter (10), and the up counter (10) and the synchronous capture circuit are respectively connected to the random access memories (11, 12); each transmitter winding is connected to a power source through respective driving power tube ($T_1$ or $T_2$), and each three-phase receiver winding is connected to the analog signal ground in a star-shaped (Y) joint and neutral point.

Each transmitter winding respectively encircles two three-phase receiver windings with different pitches by using two approximately closed coils in the same direction in series; all excitation coils are in the shape of a short-circuit loop; each phase receiver winding consists of M, which is at least 2, sub-windings of a same structure that are phase-shifted in space by 60°/M, connected in series to form a distributed winding, each sub-winding forming the distributed winding may also be a distributed winding; each time measuring, in parallel, a spatial phase or displacement of a measured position in two different pitches encircled by the same transmitter winding; after measuring the spatial phase or displacement of the measured position in a required different pitches, the microcontroller (13) de-asserts the measurement unit from running, and calculates a measured displacement by using a hybrid positioning or absolute positioning algorithm.

When a 2-pitch structure is used to measure the liner displacement, the transceiver board (1) and the excitation board (2) may move relative to each other along a measurement axis; the transceiver board (1) is arranged with a transmitter winding (1.3) extending along the measurement axis and two three-phase receiver windings (1.1, 1.2) with different pitches; the transmitter winding (1.3) separately encircles the three-phase receiver winding (1.1) with a pitch of $P_1$ and the three-phase receiver winding (1.2) with a pitch of $P_2$ by using two approximately closed rectangular coils (1.3.1, 1.3.2) in the same direction in series; and the excitation board (2) is arranged with two rows of excitation coils (2.1, 2.2) extending along the measurement axis, the two rows of excitation coils and the two three-phase receiver windings (1.1, 1.2) on the transceiver board (1) having the same pitch and coincided center lines respectively, and a shape of the excitation coil is a rounded rectangular short-circuit loop; and a spatial frequency difference between the pitches $P_2$ and $P_1$ is taken as a mid-pitch spatial frequency $F_M=1/P_2-1/P_1$, to obtain a mid-pitch $P_M=1/F_M=P_1 \cdot P_2/(P_1-P_2)=m \cdot P_1$ $(m+1) \cdot P_2$ with a wavelength ratio of m.

When a 2-pitch structure is used to measure an angular displacement, the transceiver board (1) and the excitation board (2) may rotate relative to each other around a rotating shaft, and a pitch is calculated according to an angle; the transceiver board (1) is arranged with a transmitter winding (1.3) extending along a concentric arc and two three-phase receiver windings (1.1, 1.2) with different pitches; the transmitter winding (1.3) separately encircles the three-phase receiver winding (1.1) with a pitch of $P_1$ and the three-phase receiver winding (1.2) with a pitch of $P_2$ by using two approximately closed concentric arc coils (1.3.1, 1.3.2) in the same direction in series; the excitation board (2) is arranged with two rows of excitation coils (2.1, 2.2) extending along a concentric circle, the two rows of excitation coils and the two three-phase receiver windings (1.1, 1.2) on the transceiver board (1) having the same pitch and coincided center lines respectively, and a shape of the excitation coil is a short-circuit loop formed by two concentric arcs and two radial straight lines; and a spatial frequency difference between the pitches $P_2$ and $P_1$ is taken as a mid-pitch spatial frequency $F_M=1/P_2-1/P_1$, to obtain a mid-pitch $P_M=1/F_M=P_1 \cdot P_2/(P_1-P_2)=m \cdot P_1$ $(m+1) \cdot P_2$ with a wavelength ratio of m.

When a 3-pitch structure is used to measure the liner displacement, the transceiver board (1) and the excitation board (2) may move relative to each other along a measurement axis; the transceiver board (1) is arranged with two transmitter windings (1.4, 1.5) extending along the measurement axis and three three-phase receiver windings (1.1, 1.2, 1.3) with different pitches; the first transmitter winding (1.4) separately encircles the three-phase receiver winding (1.1) with a pitch of $P_1$ and the three-phase receiver winding (1.2) with a pitch of $P_2$ by using two approximately closed rectangular coils (1.4.1, 1.4.2) in the same direction in series; the second transmitter winding (1.5) separately encircles the three-phase receiver winding (1.1) with a pitch of $P_1$ and the three-phase receiver winding (1.3) with a pitch of $P_3$ by using two approximately closed rectangular coils (1.4.1, 1.5.2) in the same direction in series; and the excitation board (2) is arranged with three rows of excitation coils (2.1, 2.2, 2.3) extending along the measurement axis, the three rows of excitation coils and the three three-phase receiver windings (1.1, 1.2, 1.3) on the transceiver board (1) having the same pitch and coincided center lines respectively, and a shape of the excitation coil is a rounded rectangular short-circuit loop.

a spatial frequency difference between the pitches $P_2$ and $P_1$ is taken as a mid-pitch spatial frequency $F_M=1/P_2-1/P_1$, to obtain a mid-pitch $P_M=1/F_M=P_1 \cdot P_2/(P_1-P_2)=m \cdot P_1$ $(m+1) \cdot P_2$ with a wavelength ratio of m; and a spatial frequency difference between the pitches $P_3$ and $P_1$ is taken as a coarse-pitch spatial frequency $F_C=1/P_3-1/P_1$, to obtain a coarse pitch $P_C=1/F_C=P_1 \cdot P_3/(P_1-P_3)=m \cdot n \cdot P_1=(m \cdot n+1) \cdot P_3$ with a wavelength ratio of n.

The driving and sampling pulse forming circuit (4) includes an odd number of cascaded phase inverters and an NAND gate ($G_{NA}$); a first clock signal ($S_{CLK}$) output by the frequency dividing circuit (3) is used as a trigger pulse of the circuit to separately connect to an input terminal of a first phase inverter and an input terminal of the NAND gate ($G_{NA}$), output of the odd number of cascaded phase inverters is connected to another input terminal of the NAND gate ($G_{NA}$), at each rising edge of the trigger pulse ($S_{CLK}$), the NAND gate ($G_{NA}$) outputs a negative narrow pulse, a width of the negative narrow pulse being equal to a total transmission delay of the odd number of cascaded phase inverters; inverting an output (Y) of the NAND gate ($G_{NA}$) to obtain a positive sample-and-hold control signal (SAH), and inverting and buffering the output (Y) of the NAND gate ($G_{NA}$) to obtain a positive drive signal (TG).

The line voltage scanning control signal generator (5) consists of 4 D-type flip-flops ($FF_{11}$, $FF_{12}$, $FF_{13}$, $FF_{14}$); a second clock signal ($P_{CLK}$) output by the frequency dividing circuit (3) is separately connected to clock terminals of the 4 D-type flip-flops, and an initializing signal (INI) output by the microcontroller (13) presets the four D-type flip-flops to 1, 0, 0, and 1, respectively; first three D-type flip-flops ($FF_{11}$, $FF_{12}$, $FF_{13}$) form a cyclic shift circular counter, and three signals ($Q_0$, $Q_1$, $Q_2$) output by the first three D-type flip-flops are high electrical levels in turn; a fourth D-type flip-flop ($FF_{14}$) counts output ($Q_0$) of a first D-type flip-flop ($FF_{11}$), and each cycle of the circular counter makes its output ($Q_3$) flip once.

The analog switch group (6) forms a three-stage switch series structure, and completes selection, exchanging and sampling of a phrase voltage for an input three-phase voltage sequentially: first-stage switches ($S_1$-$S_6$) are configured as three pairs: {$S_1$, $S_4$}, {$S_2$, $S_5$} and {$S_3$, $S_6$}, which respectively select phase voltage pairs {$u_A$, $u_B$}, {$u_A$, $u_C$} and {$u_B$, $u_C$}; second-stage switches ($S_7$-$S_8$) exchange, as required, a sequence of the phase voltage pairs selected by the first-stage switches; third-stage switches ($S_9$-$S_{10}$) sample a pair of phase voltages output by the second-stage switches, and save results in the sample-and-hold capacitors ($C_1$, $C_2$) respectively; and the differential amplifier (7) performs a subtraction operation and amplification on two phase voltage samples saved in the sample-and-hold capacitors ($C_1$, $C_2$), to obtain a corresponding line voltage sample and zero-order hold signal; under the control of an output signal of the signal generator, a line voltage cyclic scanning sampling in the order of A-B, A-C, B-C, B-A, C-A, C-B is obtained sequentially, and input three-phase voltage that does not change with time (when the sensor is not moving), but changes periodically with a measured position, of the three-phase receiver winding is synthesized into a discrete time sinusoidal signal ($u_s(n)$), and a spatial phase of the measured position within the pitch of the three-phase receiver winding is converted into an initial phase of the discrete time sinusoidal signal ($u_s(n)$).

The synchronous delay circuit consists of 3 D-type flip-flops ($FF_{21}$, $FF_{22}$, $FF_{23}$); a last output signal ($Q_3$) of the line voltage scanning control signal generator (5) connected to a clock end of a first D-type flip-flop ($FF_{21}$) is used as an input clock of the circuit, an initializing signal (INI) output by the microcontroller (13) presets the three D-type flip-flops to 1, 1, and 0, respectively, such that an output signal ($C_E$) is in a low electrical level; first two D-type flip-flops ($FF_{21}$, $FF_{22}$) form a 2-bit asynchronous subtraction counter to count down a rising edge of an input clock ($Q_3$); and when a rising edge of a fourth input clock ($Q_3$) arrives, the output signal ($C_E$) jumps to a high electrical level;

after the output signal ($C_E$) of the synchronous delay circuit jumps to the high electrical level, the up counter (10) starts counting from 0, and the synchronous capture circuit removes capture blockade; and the synchronous capture circuit consists of two D-type flip-flops ($FF_{31}$, $FF_{32}$) and an AND gate ($AG_{31}$); the initializing signal (INI) output by the microcontroller (13) asynchronously clears two D-type flip-flops ($FF_{31}$, $FF_{32}$) to 0, and blocks capture of the counting value of the up counter (10) before a delay time; the output signal ($C_E$) of the synchronous delay circuit jumps to the high electrical level at the delay time, a square wave signal ($U_Z$) output by the analog signal processing circuit sets an output signal ($C_S$) of the first D-type flip-flop ($FF_{31}$) to the high electrical level at a first rising edge afterwards, and the output signal ($C_P$) of the AND gate ($AG_{31}$) has been the same as the square wave signal ($U_Z$) since then; after synchronizing the output signal ($C_P$) of the AND gate ($AG_{31}$) with a falling edge of a system clock, the second D-type flip-flop ($FF_{32}$) separately captures the counting value of the up counter (10) in a synchronized manner on the rising edge and the falling edge of the square wave signal ($U_Z$), which are respectively stored in two random access memories (11, 12), to obtain a quantization code of the spatial phase or displacement of the measured position within the pitch of the three-phase receiver winding connected to the processing channel.

When the 2-pitch structure is used, after measuring, in parallel, phase quantization codes $N_1$ and $N_2$ with a measured position within two different pitches $P_1$ and $P_2$ encircled by a transmitter winding (1.3), a fine displacement $x_F=N_1$ (a pitch $P_1$ is correspondingly referred to as a fine pitch $P_F$), a mid-displacement $x_M=m \cdot (N_2-N_1)$, and mid-displacement increments $\Delta x_M$ in two consecutive measurements are accumulated to obtain a total displacement $x_T=\sum(\Delta x_M)$, an integer number $K_M$ of mid-pitches contained in the total displacement $x_T$ is figured out according to a relationship $x_T \approx K_M \cdot P_M + x_M$, an integer number $K_F$ of fine pitches contained in the mid-displacement $x_M$ is figured out according to a relationship $x_M \approx K_F \cdot P_F + x_F$, and a measured displacement x without range limit is obtained according to a formula $x=(m \cdot K_M + K_F) \cdot P_F + x_F$; the following absolute positioning algorithm may also be used to map the mid-displacement $x_M$ to a half-closed interval [0, $P_M$), an integer number $K_F$ of fine pitches contained in the mid-displacement $x_M$ is figured out according to a relationship $x_M \approx K_F \cdot P_F + x_F$, and a measured displacement x absolute positioned within the mid-pitch is obtained according to a formula $x=K_F \cdot P_F + x_F$.

When the 3-pitch structure is used, after measuring, in parallel, phase quantization codes $N_{11}$ and $N_{12}$ with a measured position within two different pitches $P_1$ and $P_2$ encircled by a first transmitter winding (1.4), and measuring, in parallel, phase quantization codes $N_{21}$ and $N_{23}$ with a measured position within two different pitches $P_1$ and $P_3$ encircled by a second transmitter winding (1.5), a fine displacement $x_F=N_{21}$ (a pitch $P_1$ is correspondingly referred to as a fine pitch $P_F$), a mid-displacement $x_M=m \cdot (N_{12}-N_{11})$, a coarse displacement $x_C=m \cdot n \cdot (N_{23}-N_{21})$, the coarse displacement $x_C$ is mapped to a half-closed interval [0, $P_C$), an integer number $K_M$ of mid-pitches $P_M$ contained in the coarse displacement $x_C$ is figured out according to a relationship $x_C \approx K_M \cdot P_M + x_M$, an integer number $K_F$ of fine pitches $P_F$ contained in the mid-displacement $x_M$ is figured out according to a relationship $x_M \approx K_F \cdot P_F + x_F$, an absolute displacement $x_a$ within the coarse pitch is obtained according to a formula $x_a=(m \cdot K_M + K_F) \cdot P_F + x_F$, if a measuring range is not extended, the measured displacement $x=x_a$, or a measured displacement $x=\Sigma(\Delta x_a)$ without range limit is obtained by accumulating absolute displacement increments $\Delta x_a$ in two consecutive measurements.

The beneficial effects of the present disclosure are: the present disclosure may be used for both linear displacement measurement and angular displacement measurement; both a 2-pitch structure and a 3-pitch structure may be used; and both a hybrid positioning algorithm and an absolute positioning algorithm may be used.

As mentioned above, the difference frequency operation is performed on spatial frequencies of two different pitches to obtain a longer spatial period corresponding to the frequency difference—a mid-pitch or a coarse pitch; and displacements of the measured position in the mid-pitch and the coarse pitch may be directly obtained by performing a subtraction operation and amplification on spatial phases of the measured position in two different pitches of difference frequency calculation (absolute positioning) without depending on a measuring history or process. However, a scale of the mid-pitch is limited. When the 2-pitch structure is used, a total displacement whose step pitch is a mid-pitch wavelength ratio without range limitation may be obtained by accumulating mid-pitch displacement increments in two consecutive measurements; when the 3-pitch structure is used, a scale of the coarse pitch may usually meet requirements of conventional measurement, but in application of a large range (beyond a range of the coarse pitch), a measured displacement whose step pitch is 1 and having no range limitation may also be obtained by accumulating absolute displacement increments in two consecutive measurements. The hybrid positioning method of both absolute positioning and incremental accumulation may achieve the purpose of intermittent operation of the measurement circuit and no range limit on the sensor.

The transmitter winding is connected to both ends of the power source through a drive switch ($T_1$ or $T_2$), a drive pulse output by the driving and sampling pulse forming circuit (4) excites a linear time-varying drive current with a very short duration (10 ns order of magnitude) and a very rapid rising speed (10 mA/ns order of magnitude) in the transmitter winding; a linear time-varying magnetic field generated by the current induces, in the two rows of excitation coils on the excitation board 2 coupled to the magnetic field, an eddy current that grows linearly with time. The eddy current in the two rows of excitation coils generates, in the overlapping three-phase receiver winding area, a linear time-varying magnetic field that changes periodically along the measuring path with its pitch as a period, thereby inducting, in the overlapping three-phase receiver winding, a three-phase electromotive force that does not change with time (when the sensor is not moving), but changes periodically along the measured position (relative positions of the transceiver board and the excitation board) with the pitch of each three-phase receiver winding as a period; a three-stage series-connected analog switch group (6) is used to complete selection, exchange, and sampling on the phase voltage in turn, the differential amplifier (7) implements a subtraction operation to synthesize a three-phase voltage of each three-phase receiver winding encircled by the transmitter winding that does not change with time into a discrete time sinusoidal signal, spatial phases of the measured position in two different pitches encircled by the transmitter winding are separately converted into initial phases of the two discrete time sinusoidal signals; after the discrete time sinusoidal signal is filtered by a low-pass filter (8), the sampled continuous time sinusoidal signal is restored, and the zero-crossing detector (9) transforms the continuous time sinusoidal signal into a square wave; when a transient process of the circuit is sufficiently attenuate, the synchronous delay circuit removes blockade on the up counter (10) and the synchronous capture circuit. The rising edge and the falling edge of the two square waves obtained after transformation respectively capture, after being synchronized by the system clock, a value of a same up counter 10 that starts counting from the phase zero point, to obtain quantization codes (may include a fixed offset) of the spatial phase or displacement of the measured position in two different pitches encircled by the transmitter winding. There is almost no timing requirement for signal sampling that does not change with time, and only some simple circuits are used for subsequent processing of the sampled signal. Therefore, in the present disclosure, the requirement on an electronic circuit is not high, which should be easy to integrate, and easy to implement low-cost large-scale production.

DESCRIPTION OF THE EMBODIMENTS

The following specifically describes the present disclosure with reference to the accompanying drawings and preferred embodiments of the present disclosure.

Figure 1:
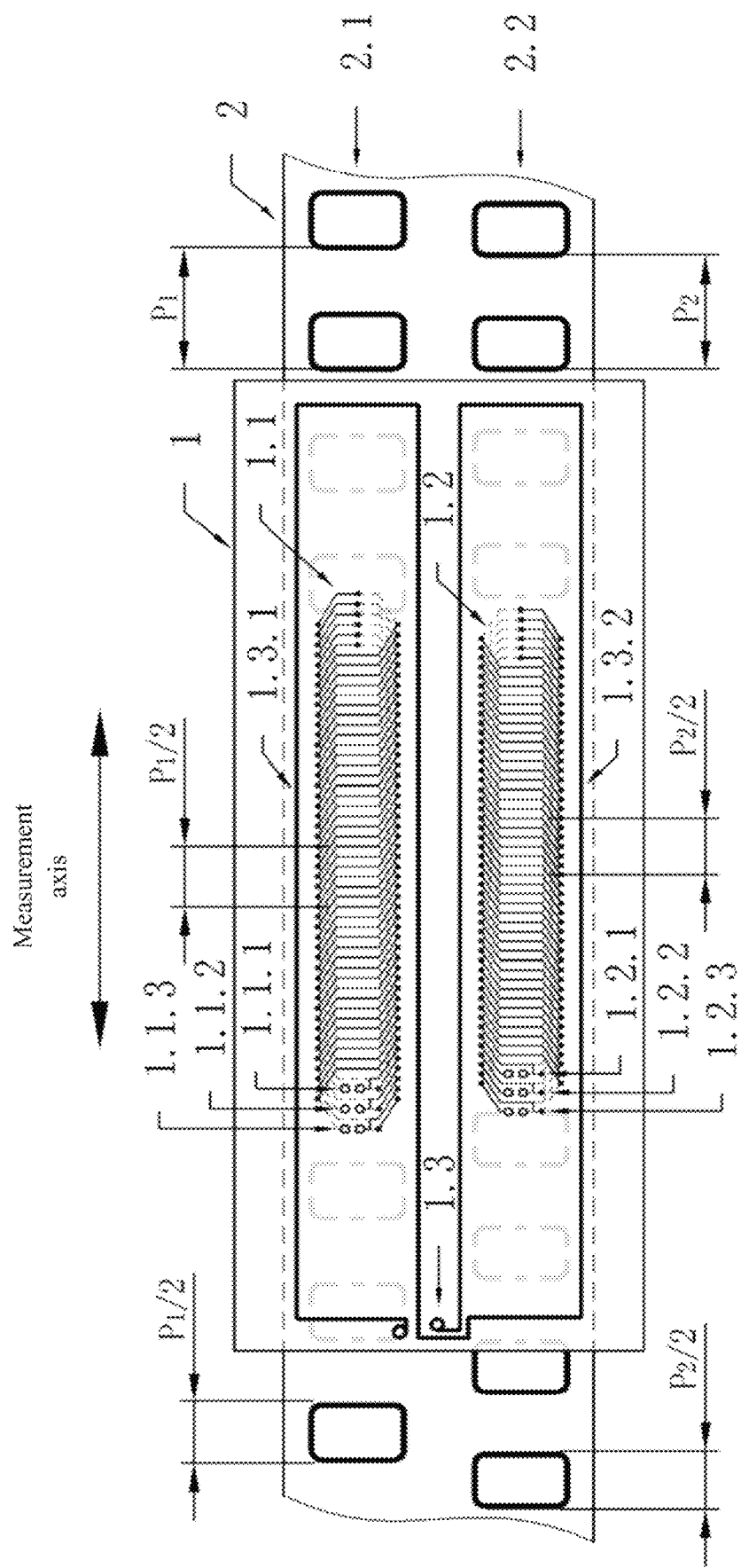
FIG. 1 is a schematic structural diagram of a sensor when a 2-pitch structure is used to measure linear displacement according to the present disclosure.

The hybrid positioning electromagnetic induction displacement sensor in the present disclosure includes a transceiver board 1 and an excitation board 2 that may move relative to each other along a measuring path. Refer to FIG. 1, FIG. 1 is a schematic structural diagram when a 2-pitch structure is used to measure linear displacement according to the present disclosure. The transceiver board 1 is arranged with a first pitch three-phase receiver winding 1.1, a second pitch three-phase receiver winding 1.2 and a transmitter winding 1.3.

The transmitter winding 1.3 separately encircles, in the same direction in series, the first pitch three-phase receiver winding 1.1 and the second pitch three-phase receiver winding 1.2 by using two approximately closed rectangular coils 1.3.1 and 1.3.2. Therefore, a single drive of the transmitter winding 1.3 may induce three-phase electromotive force containing position information both in the encircled three-phase receiver winding 1.1 and three-phase receiver winding 1.2, so as to measure, in parallel, spatial phases or displacement of the measured position in the two different pitches. This not only helps to reduce power consumption, but also enhances the ability to track the rapid movement of the sensor. In addition, an inductance value of the transmitter winding 1.3 is multiplied in the same direction in series, and a rising rate of its driving current decreases exponentially. Under constant power consumption, duration of its driving current may be extended by more than 50%, which facilitates stability and processing of an induction signal. The symmetry between the rectangular coil and the three-phase receiver winding should be maintained in the layout, and sufficient space should be left between a direction of the measurement axis and each receiver winding to ensure that a magnetic field generated by the driving current of the transmitter winding 1.3 in two three-phase receiver winding areas is approximately a two-dimensional magnetic field that does not change along the measurement axis, such that electromotive force directly induced in each receiver winding is 0.

Figure 2A:
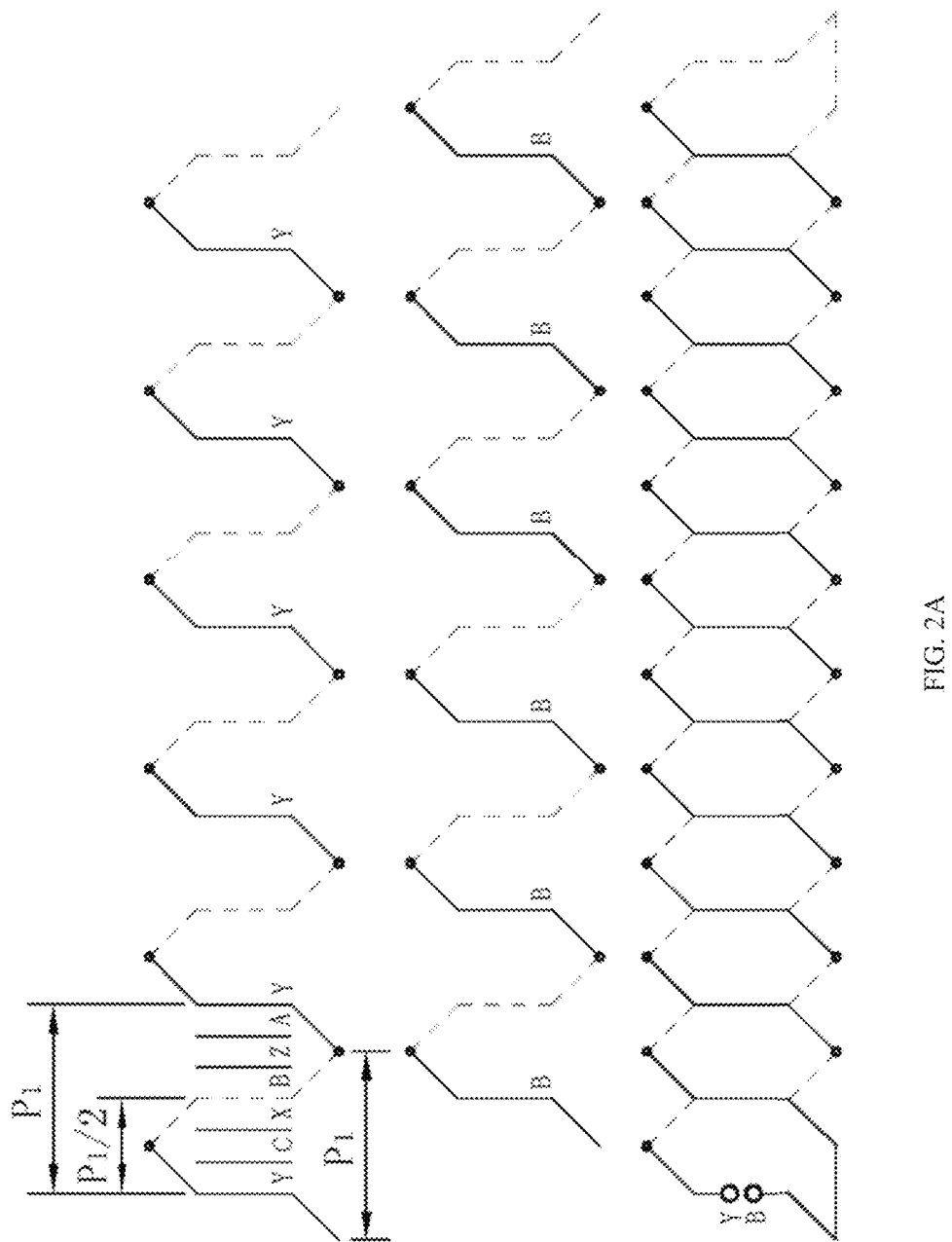
FIG. 2A is an exploded diagram of connection of concentrated receiver windings of each phase in liner displacement measurement according to the present disclosure.
Figure 2B:
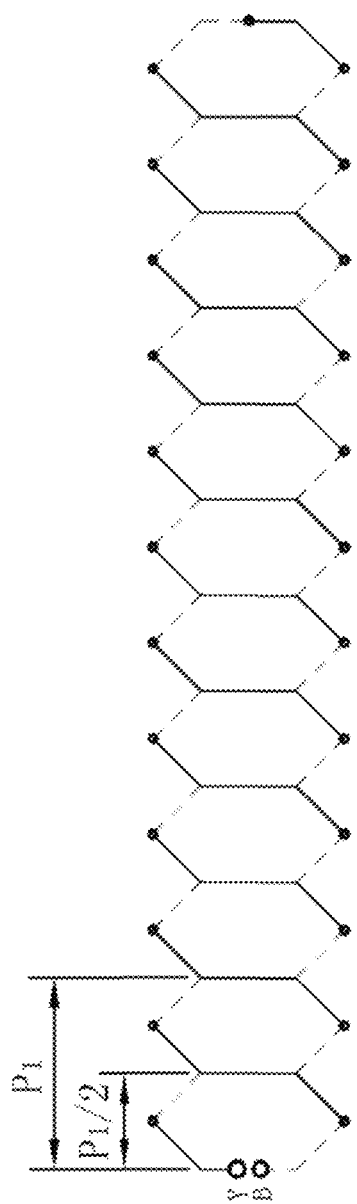
FIG. 2B is a schematic diagram of connection of concentrated receiver windings of each phase in liner displacement measurement according to the present disclosure.
Figure 2C:
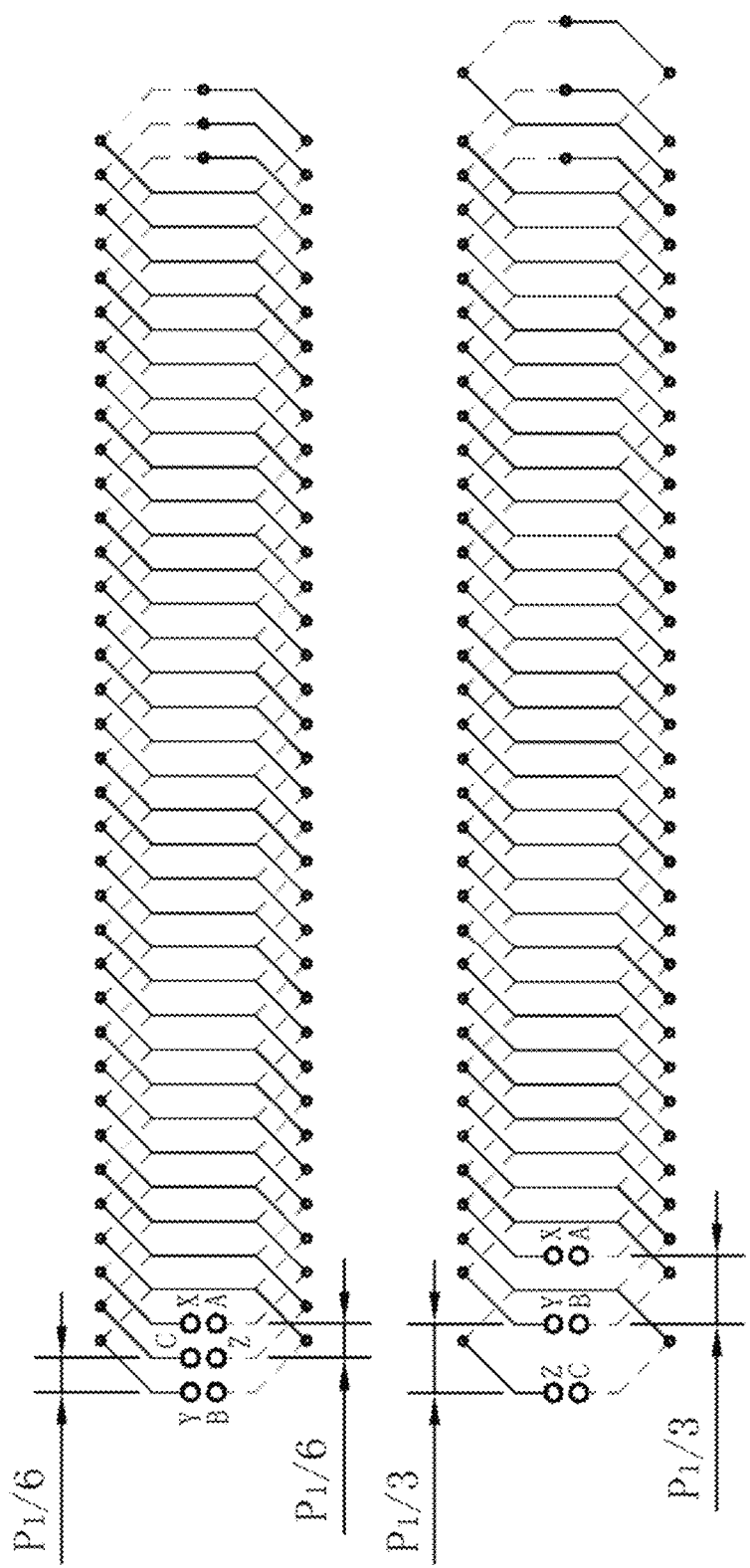
FIG. 2C is a schematic diagram of connection of three-phase concentrated receiver windings in liner displacement measurement according to the present disclosure.

The first pitch three-phase receiver winding 1.1 includes a measurement axis A-phase winding 1.1.1, a B-phase winding 1.1.3, and a C-phase winding 1.1.2 with an opposite polarity, which are of the same structure and are sequentially shifted in the space by ⅙ pitch in the order of A-C-B. The pitch of each phase winding is $P_1$, and a phase difference is 120° in the order of A-B-C. Each pitch is corresponding to 360°, such that the three-phase receiver winding may also be sequentially shifted by ⅓ pitch in the order of A-B-C. FIG. 2A is an exploded diagram of connection of receiver windings in each phase. The winding is connected by coils, and the coil consists of mirror-symmetric upper and lower sides. The dotted line in the diagram indicates that each coil is located on one side of a PCB bottom layer (Bottom Layer), and the solid line indicates that each coil is located on one side of a layer above the PCB bottom layer, which is referred to as an upper side. There is a very thin thickness between the two layers, only about 0.1 mm. The entire coil spans 1 pitch, but parallel line segments between the two sides are only half a pitch apart. Different layers of the PCB are connected by a via (the black dot in the diagram). Similar to a full-pitch wave winding of a three-phase alternating current motor, a spatial location is divided by the three-phase winding based on a 60° phase band (namely, a space occupied by each phase winding at each half pitch is corresponding to 60°, in other words, the three-phase winding evenly divides each half pitch). In each pitch range, phase bands are arranged in the order of A, Z, B, X, C, Y, where X, Y, and Z are respectively negative phases of A, B and C, namely, a difference of half a pitch or 180°; coils of all upper-layer parallel line segments belonging to a same phase that are located in a negative phase band are connected in series to form a group, and coils of all upper-layer parallel line segments belonging to a same phase that are located in a positive phase band are connected in series to form another group. The two groups of coils are connected head-to-head and tail-to-tail to form a closed loop, which may be cut from any position to elicit two terminals, and the phase winding may be obtained. Through slight adjustment of head and tail ends, a winding layout with more consistent structure and higher symmetry may be obtained, as shown in FIG. 2B, and a three-phase receiver winding formed thereby is shown in FIG. 2C.

For the three-phase receiver winding with the layout, a waveform of its induced electromotive force which changes along the measurement axis does not include an even-number harmonic wave, and line voltage does not include a multiple of 3 harmonic wave such as 3, 6, and 9; an amplitude of the harmonic wave decreases monotonically as its number increases, such that main harmonic wave components in the line voltage of the three-phase receiver winding are 5th and 7th harmonic waves. Therefore, M, which is at least 2, concentrated windings shown in FIG. 2B may be sequentially shifted in space by 60°/M, and then connected in series to form a distributed winding; amplitudes of fundamental waves and each number of harmonic wave included in an induced electromotive force of the M sub-windings are equal, but a phase difference of the fundamental wave is 60°/M while a phase difference of $v^{th}$ harmonic wave is v·60°/M. Therefore, a distribution factor of the fundamental wave (distribution factor=synthetic electromotive force amplitude/M times of the sub-winding electromotive force amplitude) is different from that of each harmonic wave. It is easy to deduce its suppression ratio $R_v$ to the $v^{th}$ harmonic wave:

$$R_v = \frac{\text{distribution factor of the fundamental wave}}{\text{distribution factor of the }v\text{th harmonic wave}} = \frac{\sin\frac{30° \cdot v}{M}}{2\sin\frac{30°}{M}\sin(30° \cdot v)} \quad \text{(a}$$

When M=2: $R_5=R_7=3.73$, namely, attenuation of the $5^{th}$ and $7^{th}$ harmonic waves is respectively 3.73 times as much as the attenuation of the fundamental wave, and the effect is remarkable.

Figure 3A:
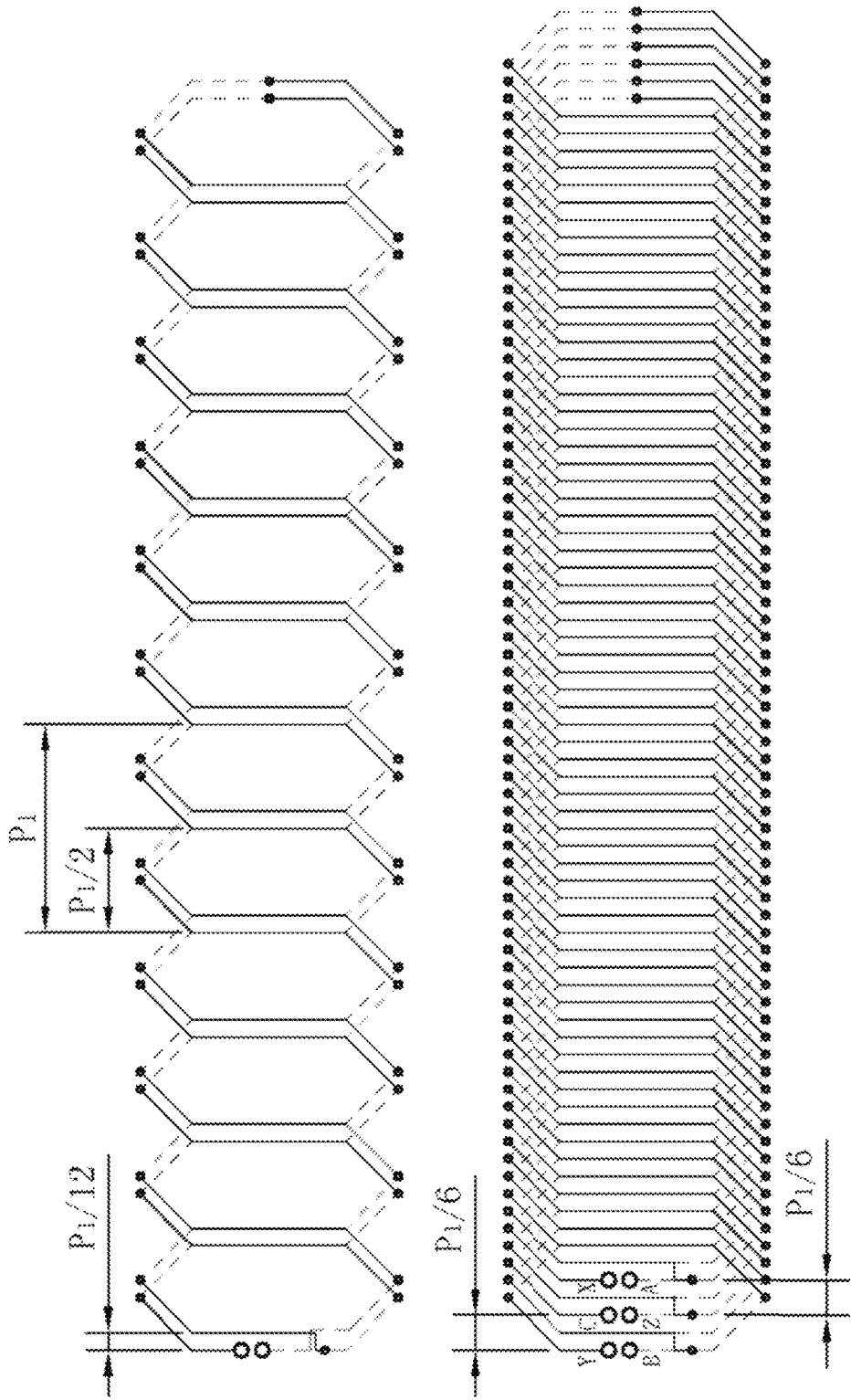
FIG. 3A is a schematic diagram of connection of distributed receiver windings implemented in an overlapping manner in liner displacement measurement according to the present disclosure.
Figure 3B:
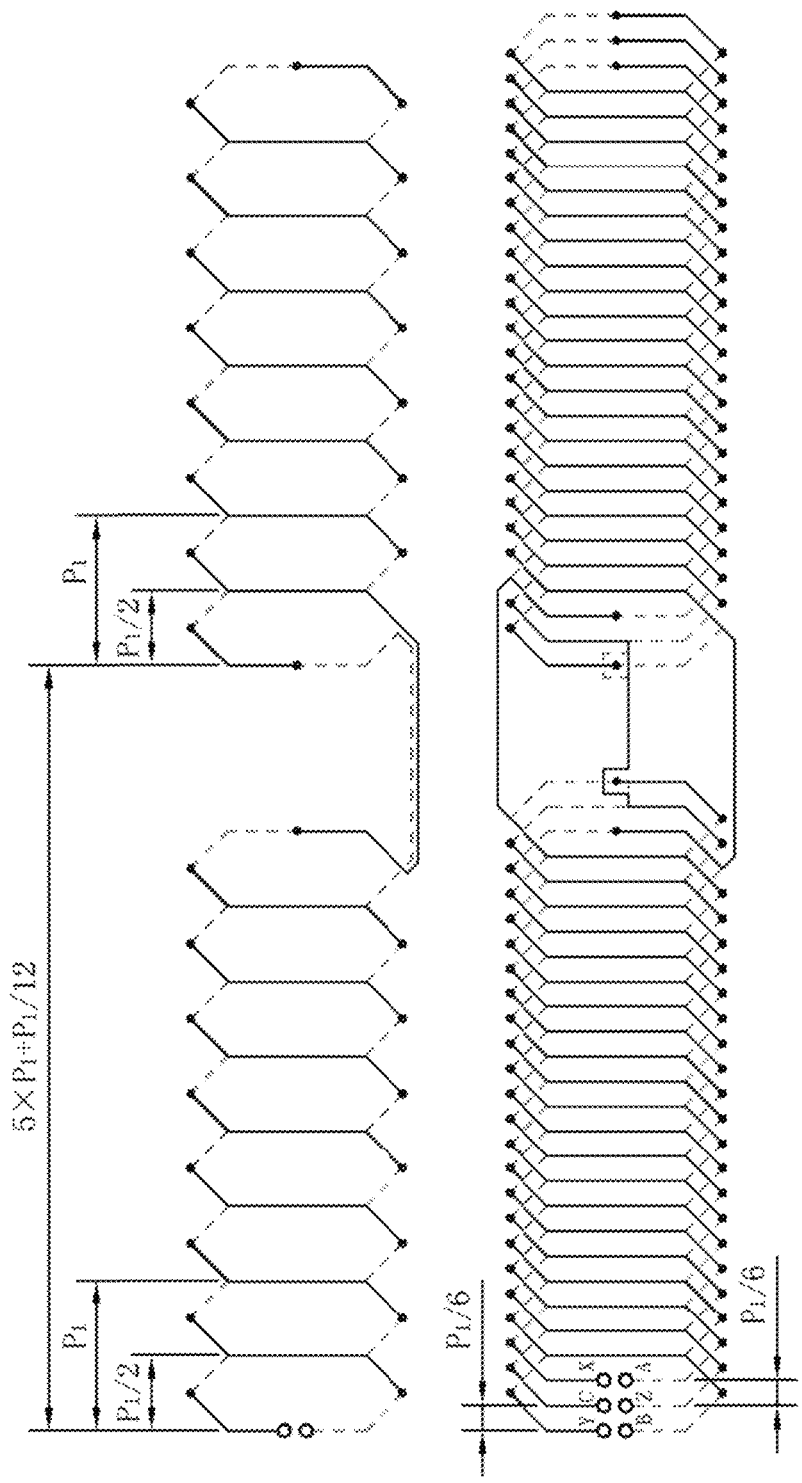
FIG. 3B is a schematic diagram of connection of distributed receiver windings implemented in a tiled manner in liner displacement measurement according to the present disclosure.
Figure 3C:
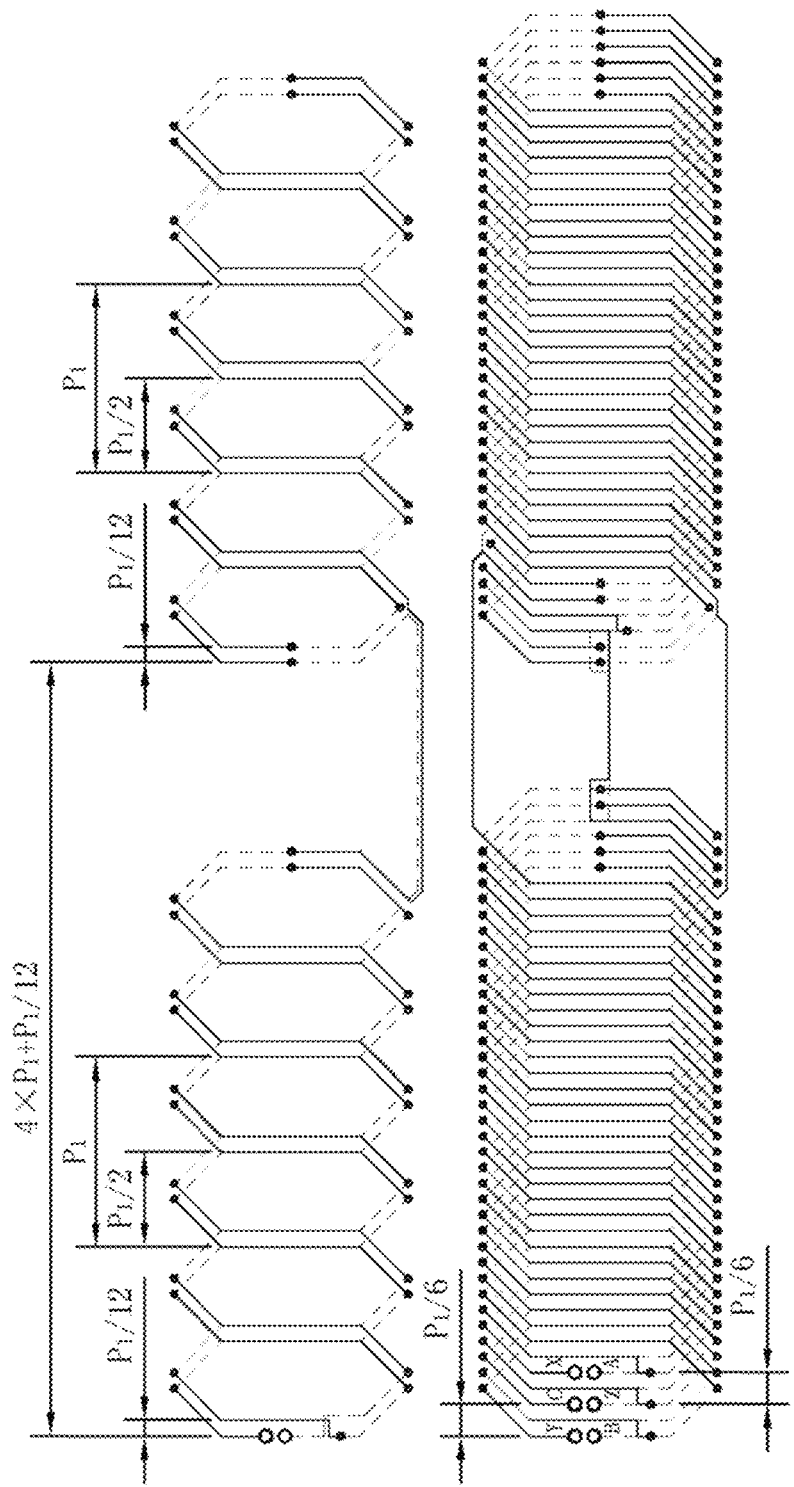
FIG. 3C is a schematic diagram of connection of distributed receiver windings implemented in a hybrid manner in liner displacement measurement according to the present disclosure.

When the pitch $P_1$ is relatively large, spatial phase shift of 60°/M may be implemented in an overlapping manner by shifting $P_1/(6M)$, as shown in FIG. 3A; when the pitch $P_1$ is relatively small, cables cannot be laid out in the overlapping manner, and the spatial phase shift may be implemented only in a tiled manner by shifting $L \cdot P_1 + P_1/(6M)$, where: L and M are integers, M≥2, and $L \cdot P_1$ is greater than a length of the sub-winding, as shown in FIG. 3B. M distributed windings with the same structure may also be used as sub-windings to be phase-shifted sequentially by 60°/M in space, which are then connected in series to form a mixed distributed winding, thereby obtaining a multiplying harmonic wave suppression ratio, as shown in FIG. 3C. In FIG. 3C, two sub-concentrated windings which are phase-shifted by 30° in an overlapping manner are connected to form a sub-distributed winding. The two sub-distributed windings are phase-shifted by 30° in a tiled manner to connect and form a mixed distributed winding, whose suppression ratio is 3.73×3.73=13.91 to both the 5th harmonic wave and the 7th harmonic wave; for a distributed winding formed by directly performing phase shift on 4 sub-concentrated windings by 15°, the harmonic wave suppression ratio $R_5$=4.66, $R_7$=6.08 is calculated according to the expression a, which is less than half of the former. In upper single-phase winding diagrams of FIG. 3A, FIG. 3B, and FIG. 3C, a pair of lines located on different layers of the PCB that is used to connect sub-windings in series should be overlapped, but in order to show the cable, the pair of lines is drawn separately in the diagram.

The second-pitch three-phase receiver winding 1.2 also includes an A-phase winding 1.2.1, a B-phase winding 1.2.3, and a C-phase winding 1.2.2 with an opposite polarity, which are of the same structure and are sequentially shifted in the space by ⅙ pitch in the order of A-C-B. The pitch of each phase winding is $P_2$, and a phase difference is 120° in the order of A-B-C. The winding connection method is exactly the same as that of the first-pitch three-phase receiver winding 1.1.

The transceiver board 1 should also include an electronic circuit that is required to complete measurement, an induction signal which is used to drive the transmitter winding 1.3, process the receiver winding 1.1 and the receiver winding 1.2, and displays a measurement result. Therefore, the transceiver board 1 is usually arranged on a fourth layer of the PCB board.

The excitation board 2 is arranged with two rows of excitation coils 2.1 and 2.2 (for clarity, an excitation coil under the receiver winding is omitted in the diagram), the excitation coil sequence 2.1 and the first pitch three-phase receiver winding 1.1 on the transceiver board 1 have the same pitch ($P_1$) and coincided center lines. Likely, the excitation coil sequence 2.2 and the second pitch three-phase receiver winding 1.2 have the same pitch ($P_2$) and coincided center lines. Shapes of the two rows of excitation coils are in a rounded rectangular short-circuit loop to weaken influence of an adjacent magnetic field. A width with side of the excitation coil along the measurement axis is equal to half of its pitch. The excitation board 2 has a simple structure and may be arranged on a single-sided PCB board.

Because lengths (scales along a direction of the measurement axis) of two rectangular coils 1.3.1 and 1.3.2 of the transmitter winding 1.3 is much longer than widths, and sufficient space between a length direction and each three-phase receiver winding is left, the rectangular coil may be approximately infinitely long for a magnetic field in each receiver winding area that is generated by the transmitter winding driving current, and a magnetic field generated by the current in each receiver winding area is approximately a two-dimensional magnetic field that does not change along the measurement axis. Therefore, an electromotive force directly induced in each receiver winding is 0.

Figure 4:
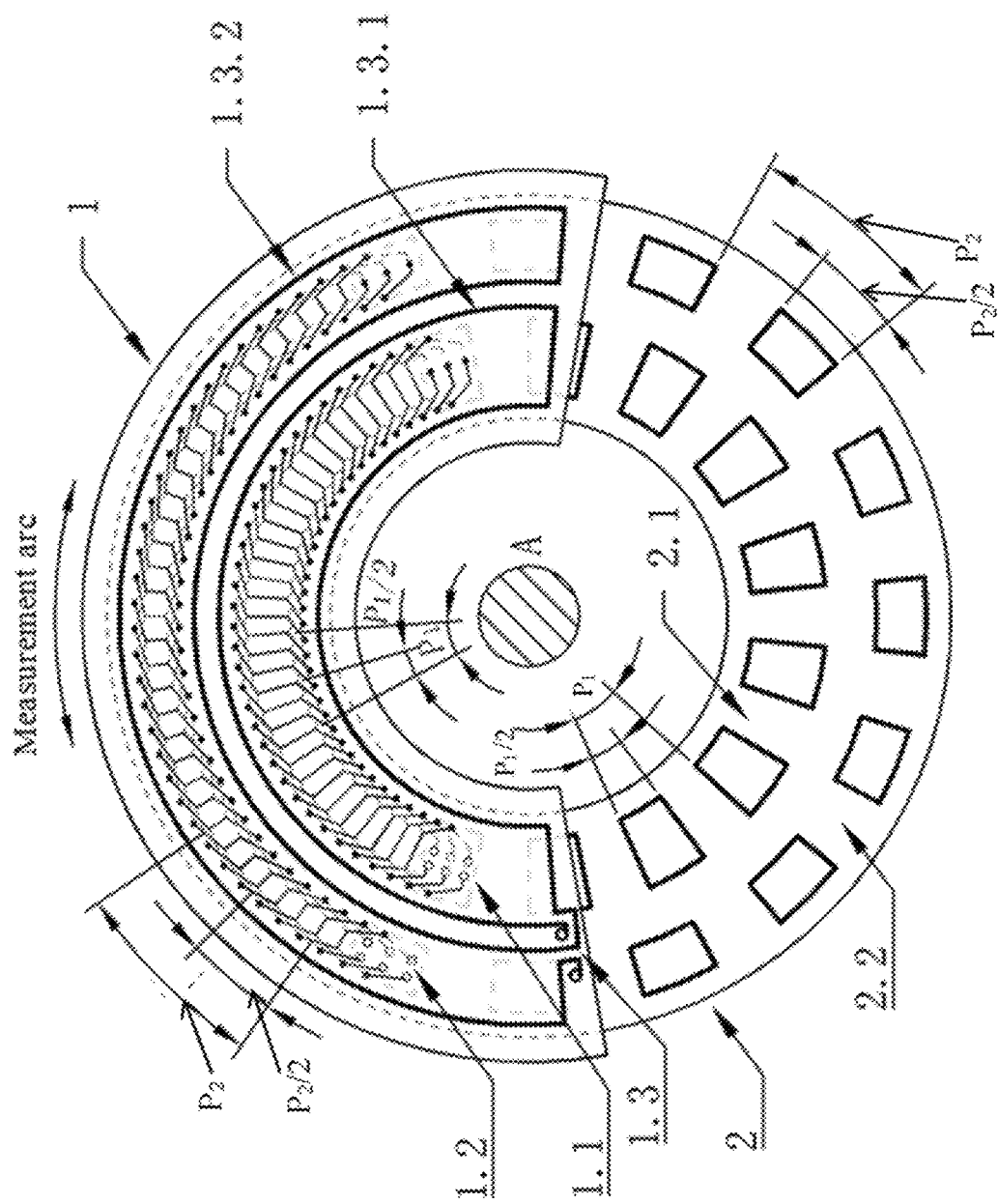
FIG. 4 is a schematic structural diagram of a sensor when a 2-pitch structure is used to measure angular displacement according to the present disclosure.
Figure 5:
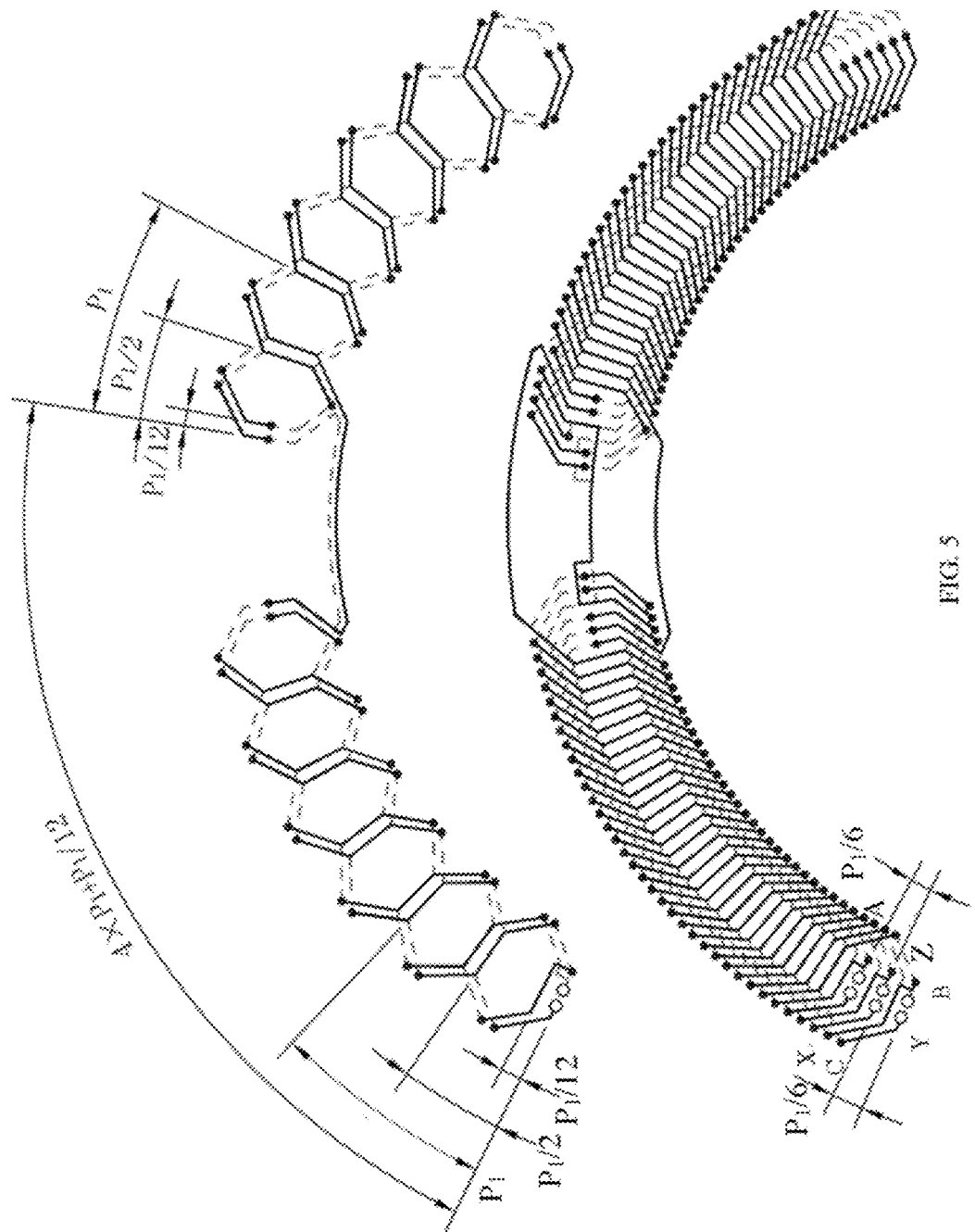
FIG. 5 is a schematic diagram of connection of distributed receiver windings implemented in a hybrid manner in angular displacement measurement according to the present disclosure.

In the present disclosure, when a 2-pitch structure is used to measure angular displacement, a sensor structure is shown in FIG. 4. The sensor consists of two parts that may rotate relative to each other along a rotating shaft A: a transceiver board 1 and an excitation board 2. The transceiver board 1 is arranged with a first pitch three-phase receiver winding 1.1, a second pitch three-phase receiver winding 1.2, and a transmitter winding 1.3 that extend along a concentric arc. The transmitter winding 1.3 separately encircles, in the same direction in series, the first pitch three-phase receiver winding 1.1 and the second pitch three-phase receiver winding 1.2 by using two approximately closed concentric arc coils 1.3.1 and 1.3.2. Both the three-phase receiver winding 1.1 and the three-phase receiver winding 1.2 use distributed windings with pitches of $P_1$ and $P_2$ respectively, which respectively consist of three phase windings with a difference of 120°. The connection diagram of a first pitch distributed three-phase receiver winding in a hybrid manner is shown in FIG. 5. The excitation board 2 is arranged with two rows of excitation coils 2.1 and 2.2 extending along a concentric circle (for clarity, an excitation coil under the receiver winding is omitted in the diagram), the excitation coil 2.1, the excitation coil 2.2, and the three-phase receiver winding 1.1 and the three-phase receiver winding 1.2 on the transceiver board 1 have the same pitch and coincided center lines respectively. Shapes of the two rows of excitation coils are in a short-circuit loop formed by two concentric arcs and two radial straight lines, and an angle spanning along a measurement arc is equal to half of its pitch. Except for distribution according to the concentric arc (circle), and that the pitch is calculated according to a central angle, other conditions are exactly the same as that in linear displacement measurement. Details are not described herein again.

If a power source voltage $V_{CC}$ is applied to both ends of the transmitter winding 1.3 through a conductive drive switch, in a time period much less than a loop time constant (μs order of magnitude), a rapid rising (10 mA/ns order of magnitude) linear time-varying drive current will be generated in the transmitter winding 1.3; a linear time-varying magnetic field generated by the current will induce, in the two rows of excitation coils on the excitation board 2 coupled to the magnetic field, an eddy current that grows linearly with time. The eddy current in each row of excitation coils generates, in the overlapping three-phase receiver winding area, a linear time-varying magnetic field that changes periodically along the measuring path with its pitch as a period, thereby inducting, in the overlapping three-phase receiver winding, a three-phase electromotive force that does not change with time (when the sensor is not moving), but changes periodically along the measured position (relative positions of the transceiver board 1 and the excitation board 2) with the pitch of the three-phase receiver winding as a period. After the distributed winding is used, spatial harmonic wave component in the three-phase receiver winding line voltage have greatly decreased. Therefore, when a relationship between a line voltage and a phase voltage is deduced, it may be assumed that the phase voltage of the three-phase receiver winding includes only fundamental wave component. After selecting a proper coordinate origin, the phase voltage of the three-phase receiver winding is as follows:

$$u_A = E_m \sin\left(2\pi \frac{x}{P} - \frac{\pi}{6}\right) \quad \text{(b)}$$

$$u_B = E_m \sin\left(2\pi \frac{x}{P} - \frac{\pi}{6} - \frac{2\pi}{3}\right) = E_m \sin\left(2\pi \frac{x}{P} - \frac{5\pi}{6}\right)$$

$$u_C = E_m \sin\left(2\pi \frac{x}{P} - \frac{\pi}{6} - \frac{4\pi}{3}\right) = E_m \sin\left(2\pi \frac{x}{P} - \frac{3\pi}{2}\right)$$

In the formula: $E_m$ is an amplitude of an electromotive force of each phase, P is a pitch of the three-phase receiver winding, x is a measured displacement, and phase voltages of A, B, and C respectively lag by 2π/3 radians (120°).

According to this, the line voltage relationship is as follows:

$$u_{AB} = u_A - u_B = \sqrt{3} E_m \sin\left(2\pi \frac{x}{P}\right) \quad \text{(c)}$$

-continued $$u_{AC} = u_A - u_C = \sqrt{3}\,E_m \sin\left(2\pi\frac{x}{P} - \frac{\pi}{3}\right)$$

$$u_{BC} = u_B - u_C = \sqrt{3}\,E_m \sin\left(2\pi\frac{x}{P} - \frac{2\pi}{3}\right)$$

$$u_{BA} = u_B - u_A = \sqrt{3}\,E_m \sin\left(2\pi\frac{x}{P} - \pi\right)$$

$$u_{CA} = u_C - u_A = \sqrt{3}\,E_m \sin\left(2\pi\frac{x}{P} - \frac{4\pi}{3}\right)$$

$$u_{CB} = u_C - u_B = \sqrt{3}\,E_m \sin\left(2\pi\frac{x}{P} - \frac{5\pi}{3}\right)$$

It can be seen that they lag by π/3 radians in the listed order. The following discrete time sinusoidal signals may be synthesized by cyclically scanning and sampling six line voltages at the same time interval according to the listed order of A-B, A-C, B-C, B-A, C-A, and C-B.

$$u_s(n) = U_m \sin\left(2\pi\frac{x}{P} - \frac{n\pi}{3}\right) \qquad (d)$$

In the formula: $U_m = \sqrt{3}E_m$ is an amplitude of the line voltage.

Obviously, it is a result of sampling the following continuous time sinusoidal signals at a time interval of T/6 (T is a time period):

$$u(t) = U_m \sin\left(2\pi\frac{x}{P} - 2\pi\frac{t}{T}\right) = U_m \sin\left(2\pi\frac{t}{T} - 2\pi\frac{x}{P} + \pi\right) \qquad (e)$$

In the above formula, a spatial phase 2πx/P of the measured position within the pitch P has been converted into an initial phase of the continuous-time sinusoidal signal u(t) (including a fixed offset π radian).

The sampled continuous-time sinusoidal signal u(t) may be restored by filtering out each number of harmonic wave of the discrete time sinusoidal signal $u_s(n)$, and a spatial phase or displacement of the measured position within the pitch may be obtained by measuring a time difference between zero crossing point and a phase zero point of the measured position.

Figure 6:
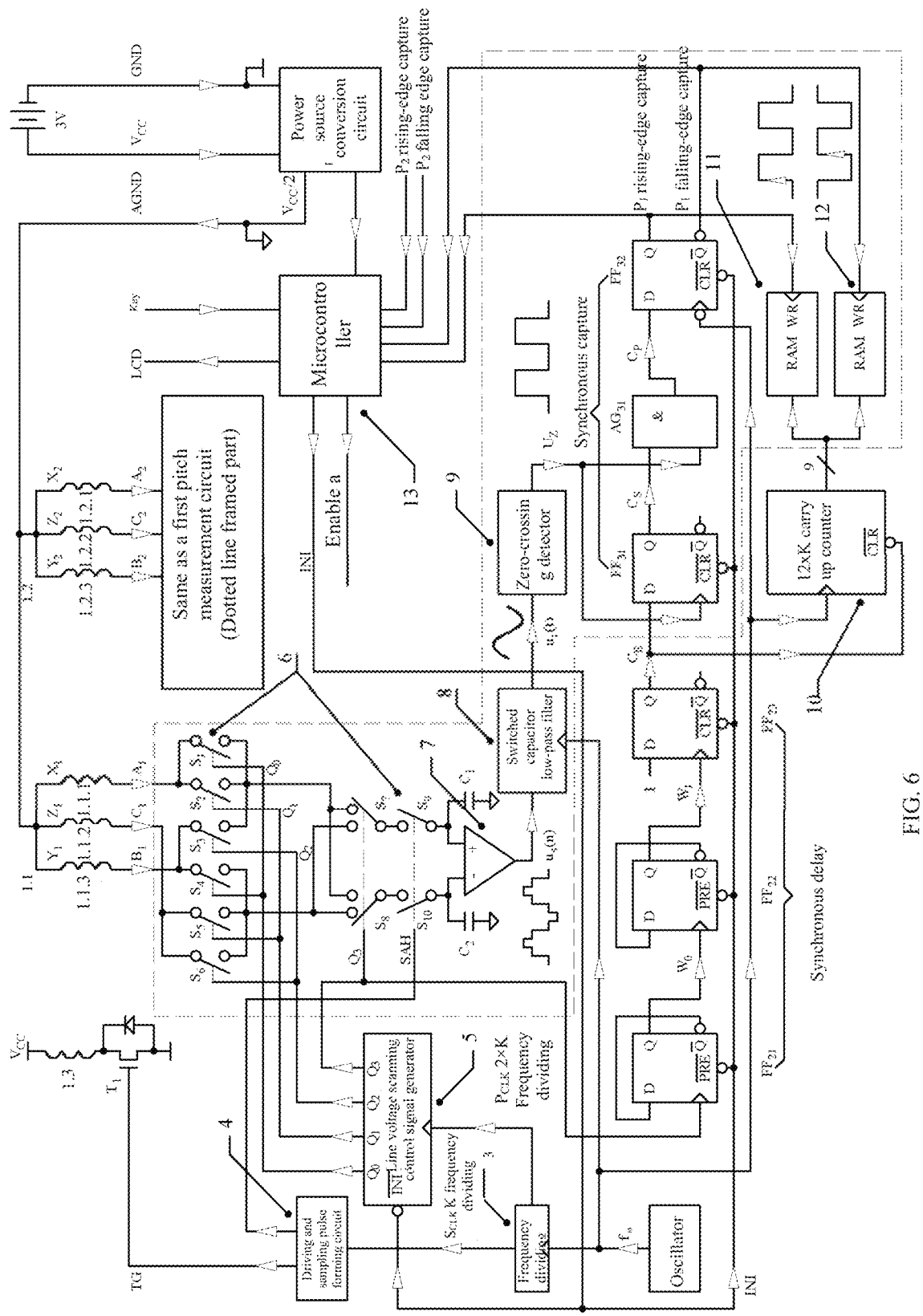
FIG. 6 is a schematic diagram of a measurement circuit when a 2-pitch structure is used according to the present disclosure.

The specific circuit through which the above assumption may be implemented is shown in FIG. 6. The entire circuit is powered by a 3V lithium battery and may be divided into three units based on functions: a central control unit, an interface unit, and a measurement unit. The central control unit only includes a low-power microcontroller 13. The interface unit includes key input, a liquid crystal display (LCD) drive circuit, a measurement interface circuit, and a power source conversion circuit. The key input and the LCD drive circuit are configured to interact with a user; the measurement interface is used to respond to and process a measurement event; and the power source conversion circuit is responsible for supplying power to the microcontroller 13 and generating half of the power source voltage $V_{CC}/2$ as an analog signal ground AGND. The remaining circuit is the measurement unit, which includes an oscillator, a frequency dividing circuit 3, a signal generator consisting of a driving and sampling pulse forming circuit 4 and a line voltage scanning control signal generator 5, an analog signal processing circuit consisting of an analog switch group 6 ($S_1$-$S_{10}$), sample-and-hold capacitors $C_1$ and $C_2$, a differential amplifier 7, a low-pass filter 8, and a zero-crossing detector 9, a phase quantization circuit consisting of a synchronous delay circuit (consisting of D-type flip-flops $FF_{21}$, $FF_{22}$, and $FF_{23}$), an up counter 10, random access memories 11 and 12, and a synchronous capture circuit (consisting of D-type flip-flops $FF_{31}$, $FF_{32}$, and an AND gate $AG_{31}$), and a transmitter winding drive power tube $T_1$, two sets of analog signal processing circuits, random access memories, and synchronous capture circuits are respectively arranged to form two parallel processing channels; the oscillator generates a system clock with a frequency of $f_M$, which provides an input clock for the frequency dividing circuit 3, a switched capacitor low-pass filter 8, a 12K carry up counter 10, and the D-type flip-flop $FF_{32}$; the frequency dividing circuit 3 generates 2 outputs: $S_{CLK}$ of K frequency dividing (a value of K is determined by a required subdivision number) is used as a trigger clock of the driving and sampling pulse forming circuit 4, and $S_{CLK}$ of 2K frequency dividing is used as an input clock of the line voltage scanning control signal generator 5; the driving and sampling pulse forming circuit 4 is separately connected to the transmitter winding drive power tube $T_1$ and the analog switch group 6, the line voltage scanning control signal generator 5 is separately connected to the analog switch group 6 and the synchronous delay circuit, and the analog switch group 6, the differential amplifier 7, the low-pass filter 8, the zero-crossing detector 9, and the synchronous capture circuit are connected in sequence. The sample-and-hold capacitors $C_1$ and $C_2$ are respectively connected between two input ends of the differential amplifier 7 and the analog signal ground; the synchronous delay circuit is separately connected to the synchronous capture circuit and the 12K carry up counter 10, the 12K carry up counter 10 and the synchronous capture circuit are also connected to random access memories 11 and 12; to reduce power consumption, the measurement unit may be enabled (Enable) and disabled (Disable), and a disable method may be to simply disconnect the power source, stop the system clock and shut down (Shutdown) the analog circuit, or the like.

Both the three-phase receiver winding 1.1 and the three-phase receiver winding 1.2 on the transceiver board 1 are in a star-shaped (Y) joint, and both of the two neutral points are connected to the analog signal ground AGND. The transmitter winding 1.3 is connected to the power source at both ends through the drive switch (NMOS power tube $T_1$).

Each time when performing measurement, the microcontroller 13 first enables the measurement unit, clears (Clear) an initializing signal INI and then sets (set) the initializing signal, such that the measurement unit may start operating; after the measurement is completed, the microcontroller 13 disables the measurement unit from operating, so as to achieve the purpose of operating intermittently, and reduce circuit power consumption.

The inductance value of the transmitter winding 1.3 is very small (less than 1 μH). After a power source voltage $V_{CC}$ is applied to the transmitter winding 1.3, current in the winding rises sharply (a rising rate is 10 mA/ns order of magnitude), so on-time of the power tube $T_1$ should be controlled accurately, and switching characteristics of the power tube and a transient process of the sampling circuit are taken into account. A pulse width of the drive signal TG should be about 30 ns.

Figure 8:
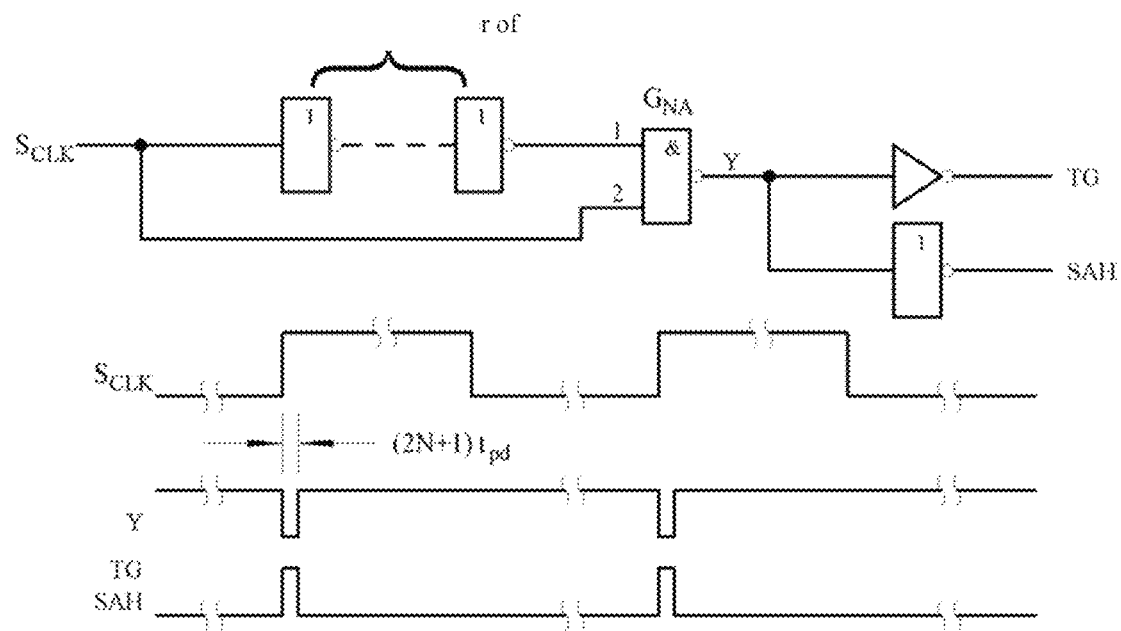
FIG. 8 is a schematic diagram of a driving and sampling pulse forming circuit according to the present disclosure.

The driving and sampling pulse forming circuit 4 generates a driving switch of the transmitter winding 1.3-sampling of a grid drive signal TG of the NMOS power tube $T_1$ and analog switches $S_9$ and $S_{10}$ (two corresponding switches in a processing channel of the second pitch three-phase receiver winding 1.2) and saving the control signal SAH. The input capacitance of the power tube $T_1$ is relatively large (100 pF order of magnitude), so the drive signal TG needs to be output through a buffer to enhance its capability of driving. The resistance-capacitance delay is difficult to generate such a transient and precise narrow pulse without fine tuning. In addition, factors such as a power source voltage and a temperature have an obvious effect on the resistance-capacitance delay. The best solution is to form a driving and sampling pulse with small batch dispersion, short duration, and no fine tuning by using a phase inverter transmission delay. A specific circuit is shown in FIG. 8. When the input signal (trigger clock) $S_{CLK}$ is in a low electrical level, an input end 2 of the NAND gate $G_NA$ is in a low electrical level while an input end 1 is in a high electrical level (due to a reverse phase for an odd number), and output Y of $G_{NA}$ is in a high electrical level; in an rising edge of the trigger clock $S_{CLK}$, the input end 2 of the NAND gate $G_{NA}$ jumps to the high electrical level while the input end 1 remains in the high electrical level (due to a transmission delay), and the output Y of $G_{NA}$ jumps to the low electrical level; it is assumed that a transmission delay of phase inverters at each stage is $t_{pd}$ (ns order of magnitude), and the number of the odd number of phase inverters is represented by (2N+1). After a delay of $(2N+1)t_{pd}$, the input end 1 of the NAND gate $G_{NA}$ jumps to the low electrical level (due to a reverse phase for an odd number), and the output Y jumps to high electrical level and remains until the rising edge of $S_{CLK}$ comes again (because $G_{NA}$ still outputs high electrical level when $S_{CLK}$ is in the low electrical level). Therefore, each rising edge of the input signal $S_{CLK}$ triggers the NAND gate $G_NA$ to output a negative narrow pulse with a pulse width of $(2N+1)t_{pd}$. The output Y of the NAND gate $G_{NA}$ is inverted to obtain a positive sample-and-hold control signal SAH, and the output Y of the $G_{NA}$ is inverted and buffered to obtain a grid drive signal TG of the power tube $T_1$.

For each drive of the transmitter winding 1.3, three-phase electromotive force is induced in both the three-phase receiver winding 1.1 and the three-phase receiver winding 1.2, so output signals of the two three-phase receiver windings may be processed in parallel. Because used circuits are exactly the same, the following discussion is only for the first pitch three-phase receiver winding 1.1.

The analog switch group 6 ($S_1$-$S_{10}$), the sample-and-hold capacitors $C_1$ and $C_2$, and the differential amplifier 7 jointly complete cyclical scanning and sampling and amplification of the line voltage of the first pitch three-phase receiver winding 1.1, to synthesize a discrete time sinusoidal signal $u_s(n)$ described in an expression (d). The control signal $Q_0$ is responsible for turning on the analog switches $S_1$ and $S_4$ to generate $u_{1A}-u_{1B}$ (or its inverse phase $u_{1B}-u_{1A}$), the control signal $Q_1$ is responsible for turning on the analog switches $S_2$ and $S_5$ to generate $u_{1A}-u_{1C}$ (or its inverse phase $u_{1C}-u_{1A}$), the control signal $Q_2$ is responsible for turning on the analog switches $S_3$ and $S_6$ to generate $u_{1B}-u_{1C}$ (or its inverse phase $u_{1C}-u_{1B}$), the control signal $Q_3$ is responsible for channel switching of the single-pole double-throw analog switches $S_7$ and $S_8$ to determine whether to reverse, and the control signal SAH is responsible for turning on the analog switches $S_9$ and $S_{10}$, sampling two phase voltages that are input and respectively storing results in the sample-and-hold capacitors $C_1$ and $C_2$. Finally, the differential amplifier 7 performs subtraction operation and amplification to obtain a line voltage sample and zero-order hold signal. It can be seen that 10 analog switch groups of the analog switch group 6 form a three-stage switch series structure to complete selection, exchange and sampling of the phase voltage in turn, which greatly simplifies the circuit with no need of decoding the control signal. When the control signals $Q_0$, $Q_1$, and $Q_2$ are in the high electrical level, each cycle of $Q_0$, $Q_1$, and $Q_2$ is inverted by $Q_3$, line voltage cyclical scanning and sampling in the order of A-B, A-C, B-C, B-A, C-A, and C-B may be obtained, to synthesize the discrete time sinusoidal signal $u_s(n)$ described in the expression (d).

Figure 7:
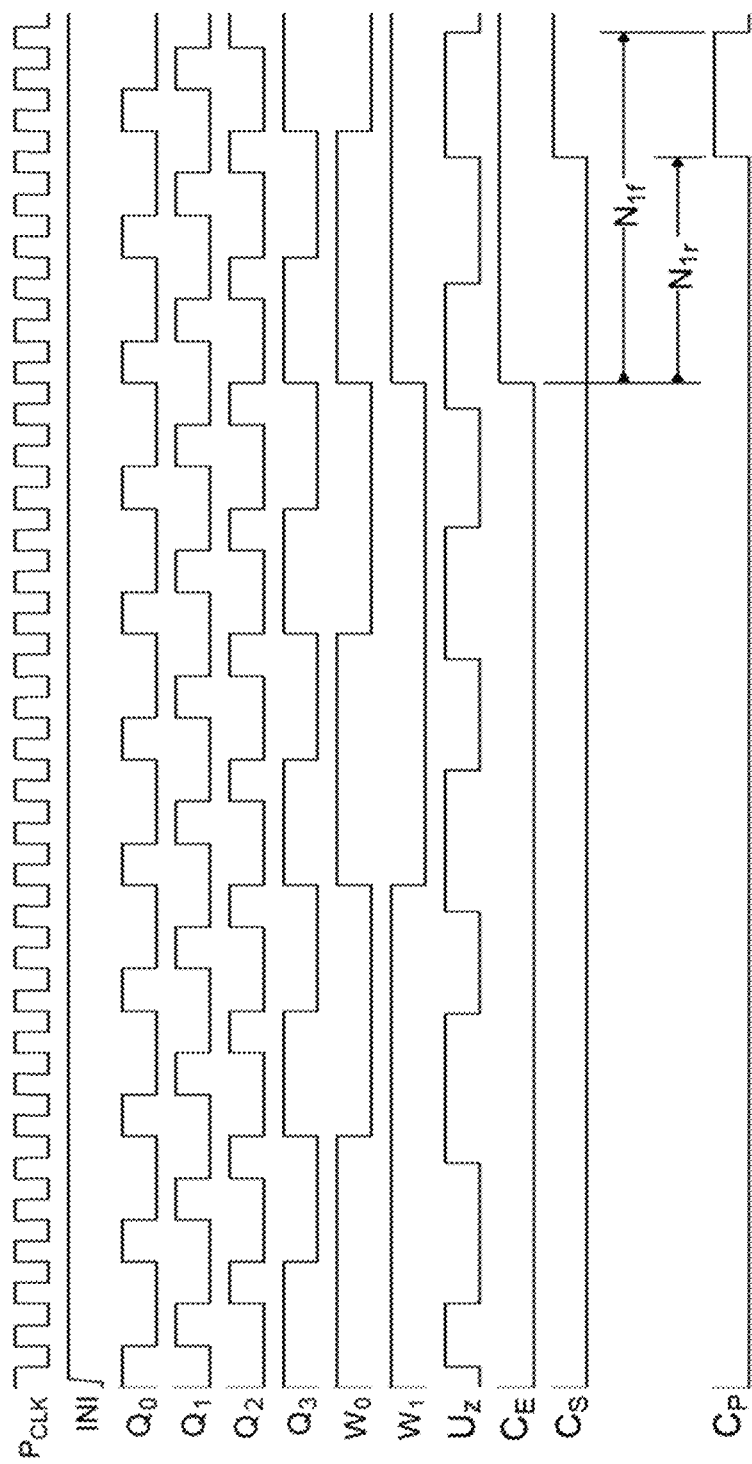
FIG. 7 is a signal waveform diagram of a measurement circuit according to the present disclosure.
Figure 9:
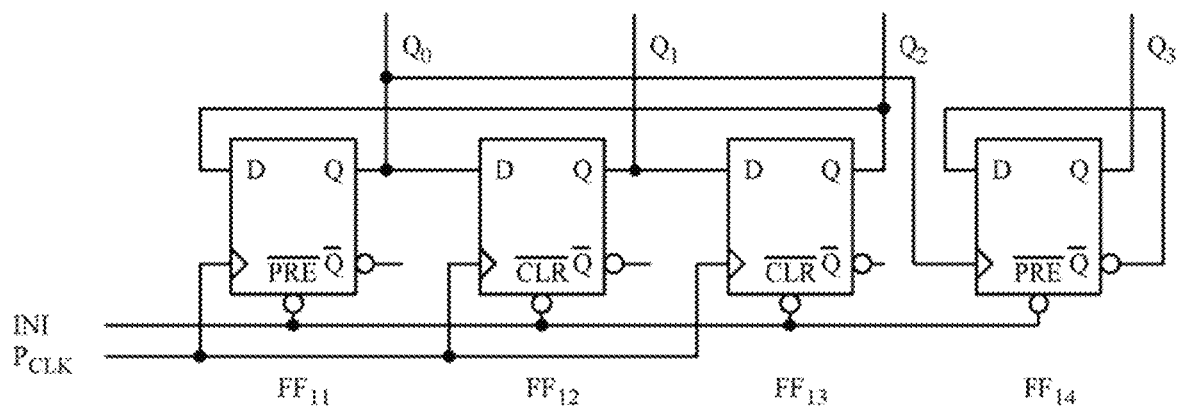
FIG. 9 is an electrical schematic diagram of a line voltage scanning control signal generator according to the present disclosure.

The implement circuit of the line voltage scanning control signal generator 5 that generates the above signals of $Q_0$, $Q_1$, $Q_2$ and $Q_3$ is shown in FIG. 9, and signal waveforms are shown in FIG. 7. D-type flip-flops $FF_{11}$, $FF_{12}$, and $FF_{13}$ form a circular counter of circular shift. The initializing signal INI presets $FF_{11}$, $FF_{12}$, and $FF_{13}$ to 1, 0, and 0, so only one of them is in the high electrical level at any time; the D-type flip-flop $FF_{14}$ counts the rising edge of $Q_0$, so its output $Q_3$ flips every cycle of $Q_0$, $Q_1$, and $Q_2$; the clock signal $P_{CLK}$ comes from the frequency dividing circuit 3, which is output by performing 2 frequency dividing on the trigger clock $S_{CLK}$; the driving and sampling pulse forming circuit 4 outputs a drive pulse and a sampling pulse at each rising edge of the trigger clock $S_{CLK}$, so each line voltage is continuously sampled twice to increase the number of samples of the discrete time sinusoidal signal $u_s(n)$ when the sensor is in relative motion. $P_{CLK}$ performs 2K frequency dividing on the system clock with a frequency of $f_M$. Each cyclic scan period (namely, a $Q_3$ period) has a total of 6 beats, including 2K×6=12K system clock periods. A corresponding line voltage changes for one period within one pitch, so each pitch or space $2\pi$ radian is subdivided into 12K equal parts.

Patent CN101949682B discloses an absolute position capacitive displacement sensor, which includes a method in which low-pass filtering and zero-crossing detection are performed on a discrete time sinusoidal signal, and an up counter is used to measure displacement and absolute position measured displacement of a measured position within each wavelength, the related contents of which are incorporated herein by reference.

The discrete time sinusoidal signal $u_s(n)$ synthesized by the differential amplifier 7 is filtered by a switched capacitor (for ease of integration) low-pass filter 8 to restore the continuous time sinusoidal signal $u_r(t)$ similar to that described in the expression (e), and at this time, a spatial phase $2\pi x/P_1$ of a measured displacement x within the pitch $P_1$ has been converted into an initial phase of $u_r(t)$; the zero-crossing detector 9 transforms the continuous time sinusoidal signal $u_r(t)$ into a square wave signal $U_Z$, whose rising edge is corresponding to a zero-crossing point of $u_r(t)$ from negative to positive, and falling edge is corresponding to a zero-crossing point of $u_r(t)$ from positive to negative. A phase difference between the rising edge and the falling edge is 180°, and a time difference between them is 12K/2=6K system clock periods with frequency of $f_M$ when the sensor is not moving. Therefore, both of the rising edge and the falling edge may be used to measure a spatial phase or displacement; a time difference between the zero-crossing point and a phase zero point of the continuous time sinusoidal signal $u_r(t)$ is proportional to the spatial phase (may include a fixed offset) of the measured position within the pitch $P_1$, so a rising edge or a falling edge of the square wave signal $U_Z$ may be used to capture a count value of the up counter that starts counting from the phase zero point and uses the system clock as the counting pulse to obtain quantization code (may include a fixed offset) of the spatial phase or displacement of the measured position within the pitch $P_1$. Because the measurement circuit operates intermittently, there must be enough time before capturing the value to make a transient process of the circuit sufficiently attenuate. Therefore, a synchronous delay circuit consists of D-type flip-flops $FF_{21}$, $FF_{22}$, and $FF_{23}$ and a synchronous capture circuit consists of D-type flip-flops $FF_{31}$, $FF_{32}$, and an AND gate $AG_{31}$ are set up. The signal waveform is shown in FIG. 7. The synchronous delay circuit, the synchronous capture circuit, a 12K carry (because each pitch is subdivided into 12K equal parts) up counter 10, random access memories 11 and 12 jointly complete a phase quantization task.

The initializing signal INI presets D-type flip-flops $FF_{21}$, $FF_{22}$, and $FF_{23}$ to 1, 1, and 0, and the low electrical level $C_E$ output by $FF_{23}$ clears the 12K carry up counter 10 to 0 asynchronously and prevents it from counting; D-type flip-flops $FF_{21}$ and $FF_{22}$ forms a 2-bit asynchronous subtraction counter to count down the rising edge of the output signal $Q_3$ from the line voltage scanning control signal generator 5; when a fourth rising edge of $Q_3$ arrives, an output signal Wi of the D-type flip-flop $FF_{22}$ generates a positive transition to set the output signal $C_E$ of $FF_{23}$ to 1: the 12K carry up counter 10 starts counting from 0, and the synchronous capture circuit removes capture blockade; therefore, the synchronous delay circuit generates a delay of four $Q_3$ periods and sets the phase zero point on the rising edge of $Q_3$.

The initializing signal INI clears the D-type flip-flops $FF_{31}$ and $FF_{32}$ to 0 asynchronously. Before a delay time, the low electrical level $C_E$ output by the synchronous delay circuit enables the D-type flip-flop $FF_{31}$ always output a low electrical level $C_S$, the AND gate $AG_{31}$ always output a low electrical level $C_P$, and the D-type flip-flop $FF_{32}$ always output a low electrical level [$P_1$ rising edge capture] and high electrical level [$P_1$ falling edge capture] signals, thereby blocking capture of the count value on the 12K carry up counter 10; at the delay time, the output signal $C_E$ of the synchronous delay circuit is set to high electrical level, and the square wave signal $U_Z$ sets the output signal $C_S$ of the D-type flip-flop $FF_{31}$ to the high electrical level in a first rising edge afterwards; the output signal $C_P$ of the AND gate $AG_{31}$ has been the same as the square wave signal $U_Z$ since then; on a falling edge of the system clock on which the 12K carry up counter 10 does not count, the D-type flip-flop $FF_{32}$ synchronizes the output signal $C_P$ of the AND gate $AG_{31}$, and outputs same-phase [$P_1$ rising edge capture] and reverse-phase [$P_1$ falling edge capture] signals, and separately captures the count value of the 12K carry up counter 10 in a synchronous manner on the rising and falling edges of the square wave signal $U_Z$, which are stored respectively in random access memories 11 and 12. At the same time, the microcontroller 13 is notified of the occurrence of a capture event, and the microcontroller 13 reads the captured value and judges whether the measurement is completed. It can be seen from the waveform diagram of FIG. 7 that the rising edge always captures first, and the falling edge lags behind for a period of time to capture. Therefore, it can be inferred, according to the capture value $N_{1r}$ of the rising edge and the capture value $N_{1f}$ of the falling edge, whether the sensor is moving and its movement direction.

When capture is finished on both the rising edge and the falling edge in the two pitches, the microcontroller 13 disables the measurement unit from operating, and the measured displacement is calculated through software.

The spatial frequency corresponding to the pitch $P_1$ is $F_1=1/P_1$, the spatial frequency corresponding to the pitch $P_2$ is $F_2=1/P_2$, and the frequency difference $F_M=F_2-F_1$ is corresponding to a larger spatial period—a mid-pitch $P_M$:

$$P_M = \frac{1}{F_M} = \frac{P_1 \cdot P_2}{P_1 - P_2} \tag{f}$$

If $P_M=m \cdot P_1$, where m is an integer and is referred to as a mid-pitch wavelength ratio, then:

$$P_2 = \frac{m}{m+1}P_1 \tag{g}$$

$$P_M = m \cdot P_1 = (m+1)P_2$$

For large-scale production, in the present disclosure, a relatively small wavelength ratio m=15 is preferentially selected, and a frequency dividing number of the trigger clocks $S_{CLK}K=2^5=32$ is taken, then each pitch is subdivided into 12K=384 parts. When a resolution of liner displacement is 10 µm, $P_1=3.84$ mm, $P_2=3.6$ mm, $P_M=15P_1=16P_2=57.6$ mm.

It is assumed that the displacement of the measured position is x, and its phase quantization codes in the pitches $P_1$ and $P_2$ are respectively $N_1$ and $N_2$ (the quantization code may be figured out by the rising edge capture value, the falling edge capture value or a midpoint value of them), and then:

$$\lambda \cdot N_1 = 2\pi \frac{x}{P_1} \bmod 2\pi = 2\pi \frac{x \bmod P_1}{P_1} \tag{h}$$

$$\lambda \cdot N_2 = 2\pi \frac{x}{P_2} \bmod 2\pi = 2\pi \frac{x \bmod P_2}{P_2}$$

$$\lambda \cdot (N_2 - N_1) = 2\pi \left(\frac{1}{P_2} - \frac{1}{P_1}\right) x \bmod 2\pi = 2\pi \frac{x \bmod P_M}{P_M}$$

$$x \bmod P_1 = \frac{P_1 \cdot \lambda}{2\pi} \cdot N_1$$

$$x \bmod P_M = \frac{P_M}{2\pi} \cdot \lambda \cdot (N_2 - N_1) = \frac{P_1 \cdot \lambda}{2\pi} \cdot m \cdot (N_2 - N_1)$$

In the formula: $\lambda$ is a proportional coefficient, and mod is a modulo operation.

The proportional coefficient $\lambda$ is selected reasonably, such that $P_1 \cdot \lambda/(2\pi)=1$, and the displacement of the measured position in the pitch $P_1$ is $x_1=x \bmod P_1=N_1$ with a step pitch of 1, which is referred to as fine displacement $x_F$ (correspondingly, the pitch $P_1$ is referred to as a fine pitch $P_F$); displacement of the measured position in the mid-pitch $P_M$ is $x_M=x \bmod P_M=m \cdot (N_2-N_1)$, and its step pitch is expanded by m times along with a range, so it is referred to as the mid-displacement $x_M$; the mid-displacement $x_M$ is a result of subtracting and amplifying phase quantization codes of two different pitches, and the method of determining the displacement in a non-accumulative manner is referred to as absolute positioning; the mid-pitch $P_M$ is only enlarged by m times with a limited scale, therefore, a mid-displacement increment $\Delta x_M$ in two consecutive measurements is accumulated to obtain a total displacement $x_T=(\Delta x_M)$ with no range limit and with a step pitch of m; because the mid-displacement $x_M$ is obtained through absolute positioning of two different pitches, the total displacement $x_T$ is obtained by accumulating mid-displacement increments, so the measurement method is referred to as hybrid positioning. It is necessary to refer to the movement direction of the sensor in calculating the mid-displacement increment $\Delta x_M$, such that a result is consistent with the movement direction, that is, positive movement generates positive increment and reverse movement generates negative increment. Therefore, if necessary, the difference $m \cdot (\Delta N_2 - \Delta N_1)$ should be corrected by adding or subtracting the mid-pitch $P_M$ (unit conversion is required, the same below). This is the main reason for using both the rising edge and the falling edge for capturing.

According to the following relationships:

$$x_T \approx K_M \cdot P_M + x_M \qquad (i)$$

$$x_M \approx K_F \cdot P_F + x_F \qquad (j)$$

In the formula: $K_M$ is the number of mid-pitches, $K_F$ is the number of fine pitches, and both of them are integers.

The integer number $K_M$ of mid-pitches included in the total displacement $x_T$, the integer number $K_F$ of fine pitches included in the mid-displacement $x_M$, and the measured displacement x with a step pitch of 1 may be figured out.

$$x = K_M \cdot P_M + K_F \cdot P_F + x_F = (m \cdot K_M + K_F) \cdot P_F + x_F \qquad (k)$$

In the hybrid positioning algorithm, the mid-displacement increment needs to be accumulated continuously, and sensor displacement between two measurements cannot exceed one mid-pitch range, so there is a minimum measurement frequency requirement. For example: when $P_M$=7.6 mm, the measurement frequency should not be lower than 44 times/second for a measurement speed of 2.5 m/s; therefore, in the present disclosure, a measurement frequency of 50 times/second is preferentially selected, and a measurement result is displayed every 6 times (approximately 8 times per second); considering that a moving speed may be low at the beginning, to further reduce the power consumption, the measurement frequency may be reduced by half to 25 times/second when the sensor is stationary and standby (static and off display). Each measurement takes about 5 cyclic scan periods ($Q_3$ period, 4 cyclic scan periods are used for delay), and a total of 384×5=1920 system clock periods with frequency of $f_M$. When the frequency $f_M$=1 MHz, it takes about 2 ms to complete the measurement. Therefore, a duty ratio of an intermittent operation of the measurement circuit is 2/20=0.1 when the sensor is moving, and it is 2/40=0.05 when the sensor is stationary and standby.

If the sensor using the 2-pitch structure is applied to short-range measuring instruments such as an indicator meter and a small caliper, the measured displacement x may be determined only by using the mid-displacement $x_M$ and the fine displacement $x_F$ in the mid-pitch range without accumulating the mid-displacement increment $\Delta x_M$ extend range to become an induction displacement sensor for absolute positioning. Compared with the existing absolute position induction displacement sensor, it has the following advantages:

1. The transmitter winding encircles two three-phase receiver windings with different pitches at the same time, and two sets of induction signals with different pitches may be obtained in one drive, such that displacement measurement of the measured position in two different pitches may be completed in parallel. This not only saves driving power consumption of a set of driving circuits and one transmitter winding, but also enhances the ability to track rapid movement of the sensor;
2. The distributed receiver winding has a strong ability to suppress the spatial harmonic wave, so it is unnecessary to use a sinusoidal winding with a large area and complex shape, which increases cable density of the receiver winding, increases the number of coils, and enhances a received signal;
3. The excitation coil is in a simple short-circuit loop shape, which is shorter than an interconnected multi-coupling loop structure, has a smaller loop resistance, a larger induced eddy current, and a stronger received signal; and has less interference than that of an adjacent magnetic field in a rectangular copper foil structure, and higher precision;
4. The drive pulse formed by using the transmission delay excites a linear time-varying current with a short duration in the transmitter winding, and induces an electromotive force that does not change with time (when the sensor is not moving) in each receiver winding, which greatly reduces timing requirements for the sampling circuit; after the induction signal is synthesized into a discrete time sinusoidal signal through a three-stage series-connected analog switch and a differential amplifier, spatial phase or displacement measurement of the measured position in two different pitches is completed through a simple circuit such as low-pass filtering, zero-crossing detection, and up counting. Therefore, the measurement circuit is easy to implement and integrate.

Only in the mid-pitch range when the measured displacement x is absolutely positioned, the mid-displacement $x_M = m \cdot (N_2 - N_1)$ is required to be mapped to a semi-closed interval [0, $P_M$) to match the fine displacement $x_F \in [0, P_F)$, namely, when $x_M$ is negative, the mid-pitch $P_M$ is added to make it positive, and the integer number $K_F$ of fine pitches included in the mid-displacement $x_M$ is figured out according to the relational equation j, and finally the measured displacement x is calculated according to the following formula:

$$x = K_F \cdot P_F + x_F \qquad (l)$$

In conclusion, in the present disclosure, there is no need to make any change to structures of the sensor and the measurement circuit, and two measurement methods of absolute positioning and hybrid positioning may be implemented only by using software algorithms. When a 2-pitch structure is used, the absolute positioning power consumption is low but the measuring range is short (only in the mid-pitch range), and hybrid positioning has no range limit but has a minimum measurement frequency requirement.

To reduce the measurement power consumption, the microcontroller 13 uses an interrupt-driven mode: namely, it enters sleep immediately every time an interrupt returns, until a new interrupt wakes it up again. Two interrupt vectors are required to complete the measurement: a timer interrupt and a capture interrupt. The timer interrupt is used to initiate measurement, and the capture interrupt is used to respond to a capture event: four external interrupt requests of [$P_1$ rising edge capture], [$P_1$ falling edge capture], [$P_2$ rising edge capture], and [$P_2$ falling edge capture]. As a summary of the previous introduction, an interrupt processing flow of two algorithms of hybrid positioning and absolute positioning when a 2-pitch structure is used is summarized as follows:

I. Hybrid Positioning

Figure 10:
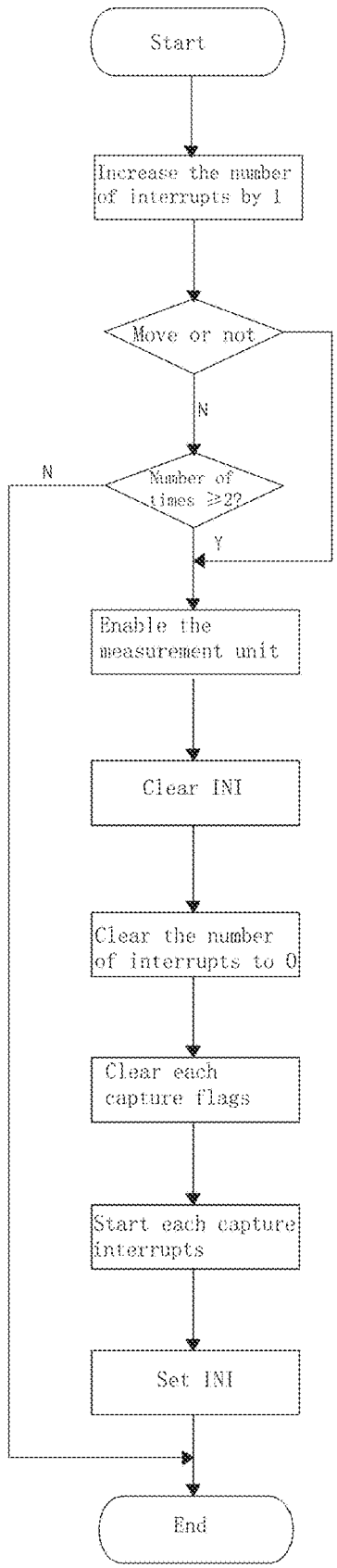
FIG. 10 is a flowchart of timer interrupt processing when a 2-pitch structure is used according to the present disclosure.

The timer interrupts every 20 ms, and initiates a measurement with a maximum frequency of 50 times/second. The measurement frequency is halved when the sensor is stationary or standby; four external interrupt requests of [$P_1$ rising edge capture], [$P_1$ falling edge capture], [$P_2$ rising edge capture] and [$P_2$ falling edge capture] are enabled (Enable) to respond to the capture event in time. A processing flow is shown in FIG. 10.

Figure 11:
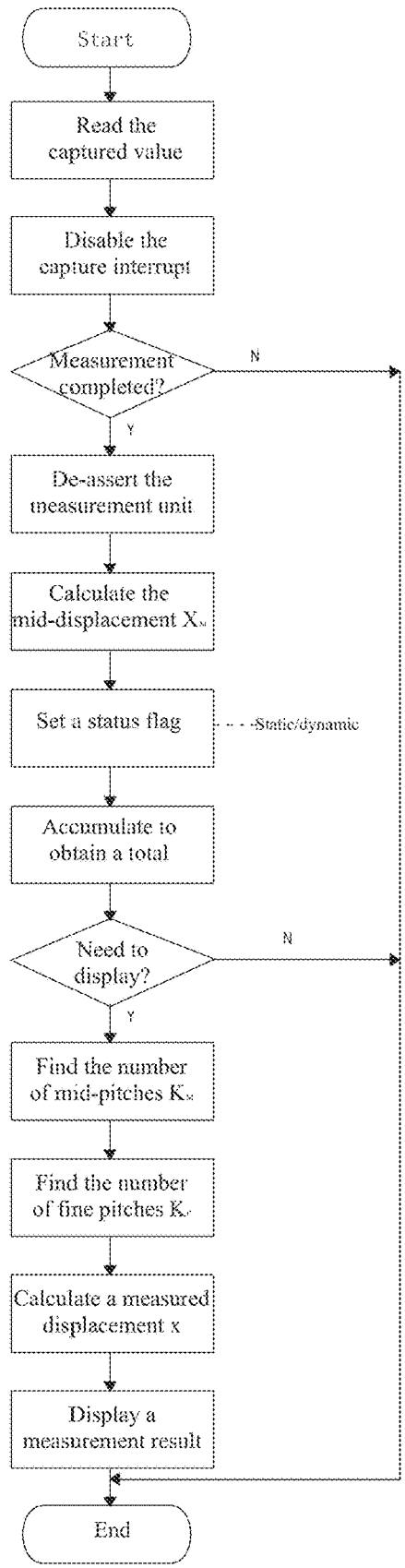
FIG. 11 is a flowchart of hybrid positioning algorithm capture interrupt processing when a 2-pitch structure is used according to the present disclosure.

In a capture interrupt service process, the measurement process and data are processed. To avoid repeated interrupts, an interrupt request of the capture is disabled (Disable) after reading a capture value of the interrupt source; if the measurement has been completed (interrupt requests of four captures are all disabled): the measurement unit is disabled from operating, a mid-displacement $x_M = m \cdot (N_2 - N_1)$ is calculated, it is determined whether the sensor is moving, and a status flag is set to cooperate with the timer interrupt to implement dynamic/static state frequency conversion measurement, and mid-displacement increment $\Delta x_M$ is accumulated to obtain a total displacement $x_T = \Sigma(\Delta x_M)$ without range limit; when a measurement result is required to be displayed (it is a sixth measurement since the last display): the integer number $K_M$ of mid-pitches included in the total displacement $x_T$ is figured out according to the relational equation (i), the integer number $K_F$ of fine pitches included in the mid-displacement $x_M$ is figured out according to the relational equation (j), the measured displacement x is calculated according to the formula (k), and the measurement result is displayed based on user requirements. The flow chart is shown in FIG. 11.

II. Absolute Positioning

The timer interrupts every 125 ms, and initiates a measurement with a maximum frequency of 8 times/second. The measurement frequency is halved when the sensor is stationary or standby. The processing flow is exactly the same as that of hybrid positioning, as shown in FIG. 10.

Figure 12:
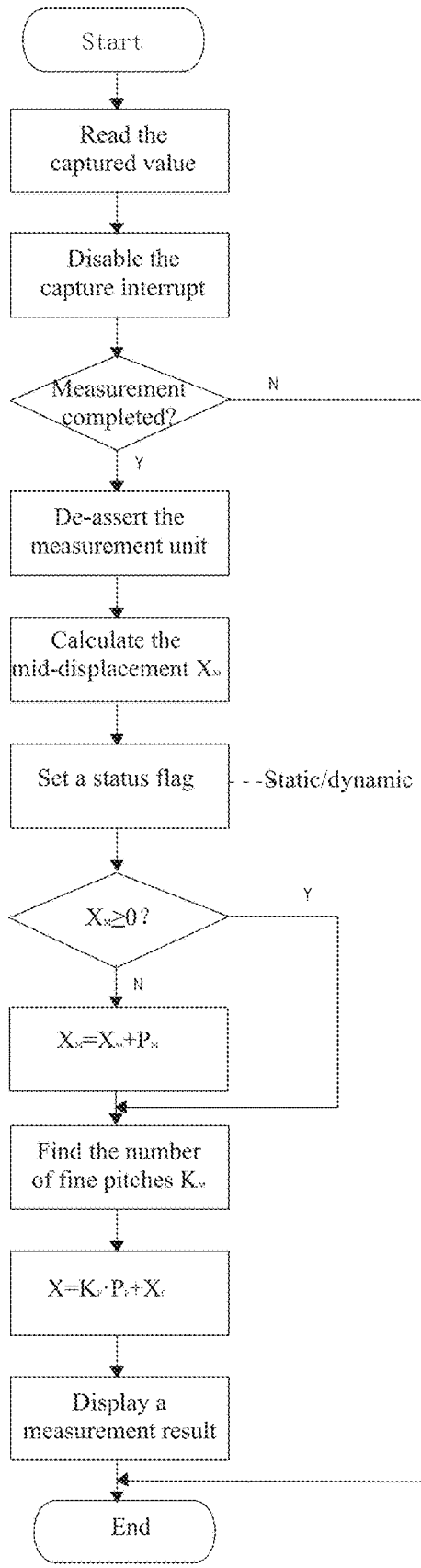
FIG. 12 is a flowchart of absolute positioning algorithm capture interrupt processing when a 2-pitch structure is used according to the present disclosure.

The processing flow of the capture interrupt is similar to that of hybrid positioning, except that a method of determining the measured displacement is different from that, and a measurement result is displayed for each measurement, as shown in FIG. 12. The capture value of the interrupt source is read, and the interrupt request of the capture is disabled; if the measurement has been completed, the measurement unit is disabled, the mid-displacement $x_M = m \cdot (N_2 - N_1)$ is calculated, it is determined whether the sensor is moving, and a status flag is set, the mid-displacement $x_M$ is mapped to a semi-closed interval $[0, P_M)$, the integer number $K_F$ of fine pitches included in the mid-displacement $x_M$ is figured out according to the relational equation (j), the measured displacement x is calculated according to the formula (l), and the measurement result is displayed based on user requirements.

Figure 13:
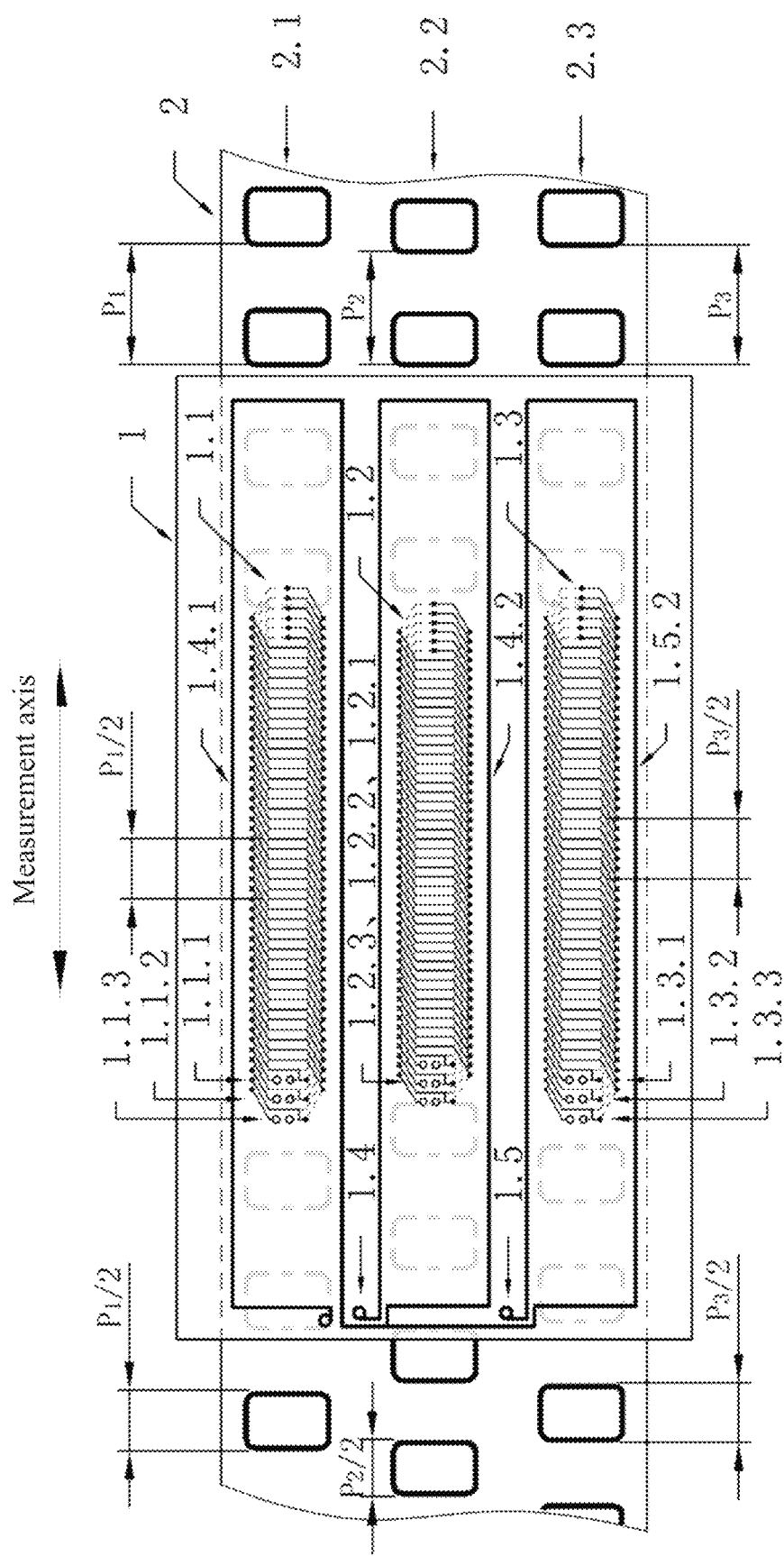
FIG. 13 is a schematic structural diagram of a sensor when a 3-pitch structure is used to measure liner displacement according to the present disclosure.

If space permits, a 3-pitch structure may also be used in the present disclosure. The sensor structure when a linear displacement is measured is shown in FIG. 13. It consists of two parts that may move relative to each other along a measurement axis: a transceiver board 1 and an excitation board 2.

The transceiver board 1 is arranged with three three-phase receiver windings 1.1, 1.2, and 1.3 with different pitches and two transmitter windings 1.4 and 1.5. The transmitter winding 1.4 separately encircles, in the same direction in series, a first pitch three-phase receiver winding 1.1 and a second pitch three-phase receiver winding 1.2 by using two approximately closed rectangular coils 1.4.1 and 1.4.2; the transmitter winding 1.5 separately encircles, in the same direction in series, the first pitch three-phase receiver winding 1.1 and a third pitch three-phase receiver winding 1.3 by using two approximately closed rectangular coils 1.4.1 and 1.5.2. All the three-phase receiver windings 1.1, 1.2, and 1.3 use distributed windings with pitches of $P_1$, $P_2$, and $P_3$ respectively, which respectively consist of three phase windings with a difference of 120°.

The excitation board 2 is arranged with three rows of excitation coils 2.1, 2.2, and 2.3 extending along a measurement axis (for clarity, an excitation coil under the receiver winding is omitted in the diagram), the excitation coil 2.1, the excitation coil 2.2, the excitation coil 2.3, and the three-phase receiver winding 1.1, the three-phase receiver winding 1.2, and the three-phase receiver winding 1.3 on the transceiver board 1 have the same pitch and coincided center lines respectively; shapes of the three rows of excitation coils are in a rounded rectangular short-circuit loop, and a width with side along the measurement axis is equal to half of its pitch.

The transmitter winding 1.4 and the first pitch three-phase receiver winding 1.1 and the second pitch three-phase receiver winding 1.2 encircled by the transmitter winding 1.4 form a transceiver board in the 2-pitch structure that has been described in detail, which is used to measure displacement within the mid-pitch; the transmitter winding 1.5 and the first pitch three-phase receiver winding 1.1 and the third pitch three-phase receiver winding 1.3 encircled by the transmitter winding 1.5 form another transceiver board in the 2-pitch structure, which is used to measure displacement within a coarse pitch with a larger step pitch and range than those of the mid-pitch; two 2-pitch structures share a rectangular coil 1.4.1 and the three-phase receiver winding 1.1 surrounded by the rectangular coil, such that the three-pitch structure is equivalent to combination of two 2-pitch structures. Both of the transceiver board 1 and the excitation board 2 are extended from the linear displacement sensor in the 2-pitch structure, design methods are exactly the same, and details are not described herein again.

The coarse pitch $P_C$ similar to the expression (f) may be obtained by using a derivation process similar to the mid-pitch $P_M$:

$$P_C = \frac{P_1 \cdot P_3}{P_1 - P_3} \qquad (m)$$

If $P_C = n \cdot P_M = m \cdot n \cdot P_1$, where n is an integer in the formula, and is referred to as a coarse pitch wavelength ratio, then:

$$P_3 = \frac{m \cdot n}{m \cdot n + 1} P_1 \qquad (n)$$

$$P_C = n \cdot P_M = m \cdot n \cdot P_1 = (m \cdot n + 1) P_3$$

In the present disclosure, on the basis of a preferred parameter in the 2-pitch structure, a coarse pitch wavelength ratio n=m=15 is used, so parameters of a sensor in the 3-pitch structure are: $P_1 = 3.84$ mm, $P_2 = 3.6$ mm, $P_3 = 3.823$ mm, $P_M = 15\, P_1 = 57.6$ mm, and $P_C = 225\, P_1 = 864$ mm.

If phase quantization codes $N_{11}$ and $N_{12}$ of the measured position in two different pitches $P_1$ and $P_2$ of a first 2-pitch structure may be measured in parallel step by step, and phase quantization codes $N_{21}$ and $N_{23}$ of the measured position in two different pitches $P_1$ and $P_3$ of a second 2-pitch structure may be measured in parallel step by step, it is similar to a derivation process of the expression (h), a displacement $x_1 = x \bmod P_1 = N_{21}$ of the measured position in the pitch $P_1$ (Because the pitch $P_1$ and $P_3$ are far apart, accuracy of $N_{21}$ is higher than that of $N_{11}$) with a step pitch of 1, which is referred to as a fine displacement $x_F$ afterwards (correspondingly, the pitch $P_1$ is referred to as a fine pitch $P_F$); a displacement of the measured position in a mid-pitch $P_M$ is $x_M = x \bmod P_M = m \cdot (N_{12} - N_{11})$ with a step pitch of m, which is referred to as a mid-displacement $x_M$ afterwards; and a displacement of the measured position in the coarse pitch $P_C$ is $x_C = x \bmod P_C = m \cdot n \cdot (N_{23} - N_{21})$ with a step pitch of m·n, which is referred to as a coarse displacement $x_C$ afterwards. After the coarse displacement $x_C$, the mid-displacement $x_M$, and the fine displacement $x_F$ are obtained, the measured displacement x may be calculated based on the following steps: the coarse displacement $x_C$ is mapped to the semi-closed interval [0, $P_C$) to match the fine displacement $x_F \in$[0, $P_F$), the total displacement $x_T$ is replaced with the coarse displacement $x_C$, and the integer number $K_M$ of the mid-pitches included in the coarse displacement $x_C$ is figured out according to the relational expression (i), and the integer number $K_F$ of fine pitches included in the mid-displacement $x_M$ is figured out according to the relational expression (j), an absolute displacement $x_a$ of the measured position within the coarse pitch $P_C$ is calculated according to the formula (k); generally, the absolute displacement is the measured displacement $x=x_a$ to be figured out, but in application of a large range (beyond the range of the coarse pitch $P_C$), the measured displacement $x=\Sigma(\Delta x_a)$ without range limitation may be obtained by accumulating an absolute displacement increment $\Delta x_a$ of two consecutive measurements. The coarse pitch has a relatively large value, and even if the absolute displacement increment is accumulated, there is no need to increase the measurement frequency.

Figure 14:
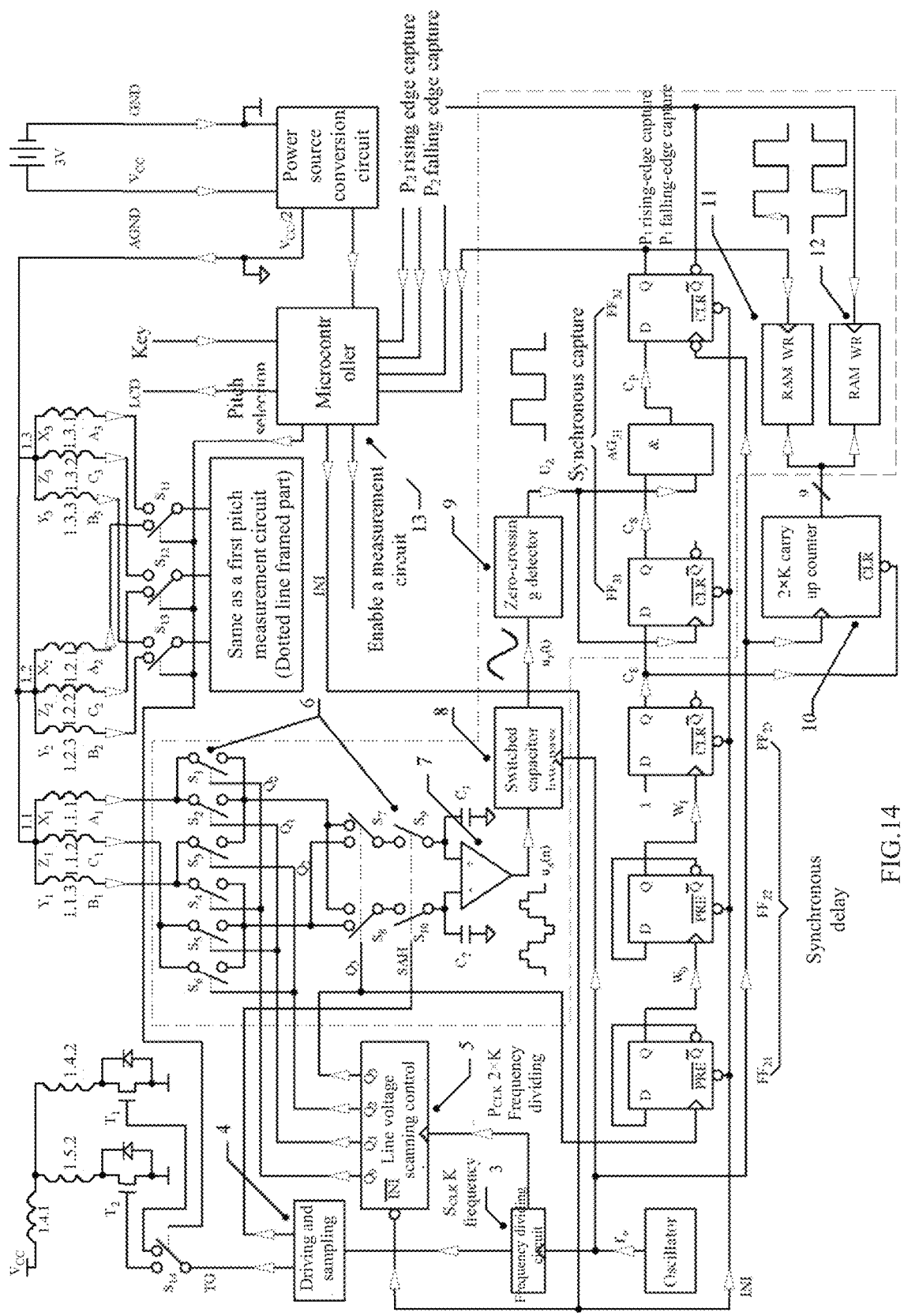
FIG. 14 is a schematic diagram of a measurement circuit when a 3-pitch structure is used according to the present disclosure.

The specific circuit to implement the above step-by-step measurement is shown in FIG. 14. Only one NMOS power tube $T_2$ and four multiple analog switches $S_{11}$-$S_{14}$ (including control signals [Pitch selection]) are added to the measurement circuit that is in the 2-pitch structure shown in FIG. 6. Therefore, operating principles are exactly the same. After enabling the measurement unit, the microcontroller 13 outputs a low electrical level [pitch selection] signal; connects an output terminal of the drive signal $T_G$ to a grid of the drive power tube $T_1$ to drive the transmitter winding 1.4 (consisting of coils 1.4.1 and 1.4.2), connects an output terminal of the second pitch three-phase receiver winding 1.2 to a second processing channel, then clears the initializing signal INI to 0 and sets it to initiate a first measurement, to measure, in parallel, phase quantization codes $N_{11}$ and $N_{12}$ of the measured position within the first pitch $P_1$ and the second pitch $P_2$; then the microcontroller 13 outputs a high electrical level [pitch selection] signal: connects the output terminal of the drive signal $T_G$ to a grid of a drive power tube $T_2$ to drive the transmitter winding 1.5 (consisting of coils 1.4.1 and 1.5.2), connects an output terminal of the third pitch three-phase receiver winding 1.3 to the second processing channel, then clears the initializing signal INI to 0 again and sets it to initiate a second measurement, to measure, in parallel, phase quantization codes $N_{21}$ and $N_{23}$ of the measured position within the first pitch $P_1$ and the third pitch $P_3$; then the microcontroller disables the measurement unit, and calculates the absolute displacement $x_a$ of the measured position within the coarse pitch according to the absolute positioning algorithm, and accumulates the absolute displacement increment $\Delta x_a$ in two consecutive measurements to extend the range as required.

Similar to the 2-pitch structure, the microcontroller 13 also uses the interrupt drive mode, and two interrupt vectors are required to complete the measurement: a timer interrupt and a capture interrupt.

Figure 15:
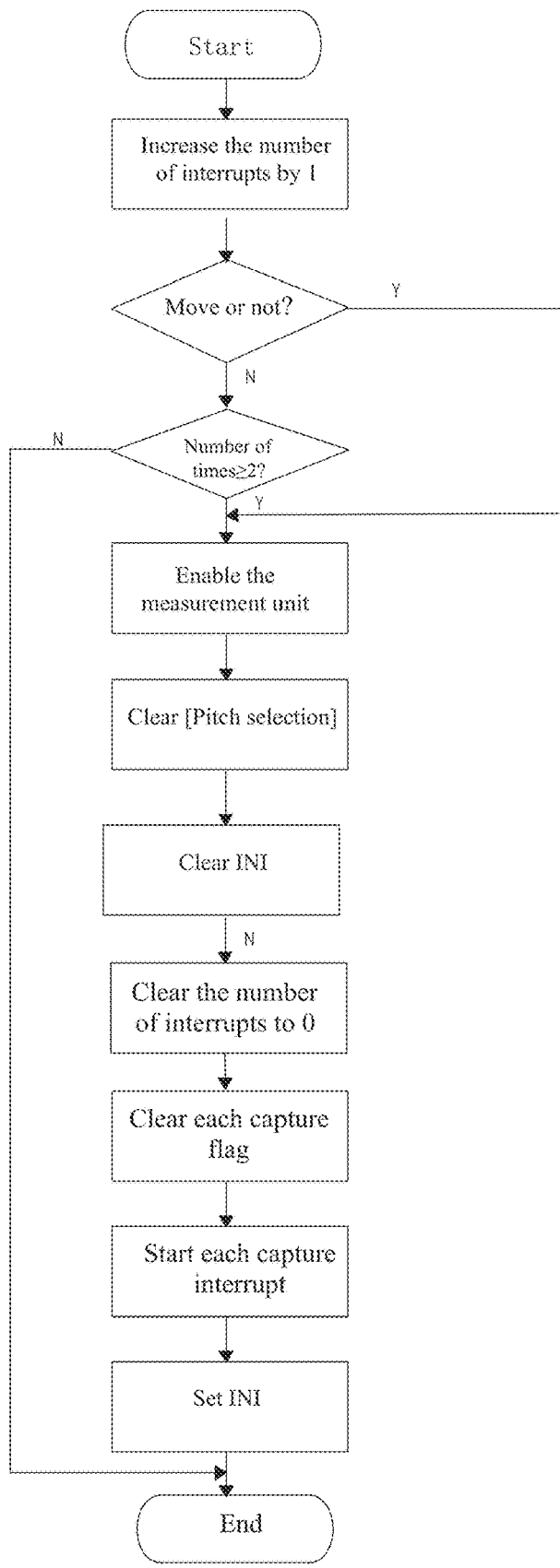
FIG. 15 is a flowchart of timer interrupt processing when a 3-pitch structure is used according to the present disclosure.

The timer interrupts every 125 ms, and initiates a measurement with a maximum frequency of 8 times/second. The measurement frequency is halved when the sensor is stationary or standby. Compared with the processing flow when the 2-pitch structure is used, there is one more step of "clearing a [pitch selection] signal to 0", as shown in FIG. 15.

Figure 16:
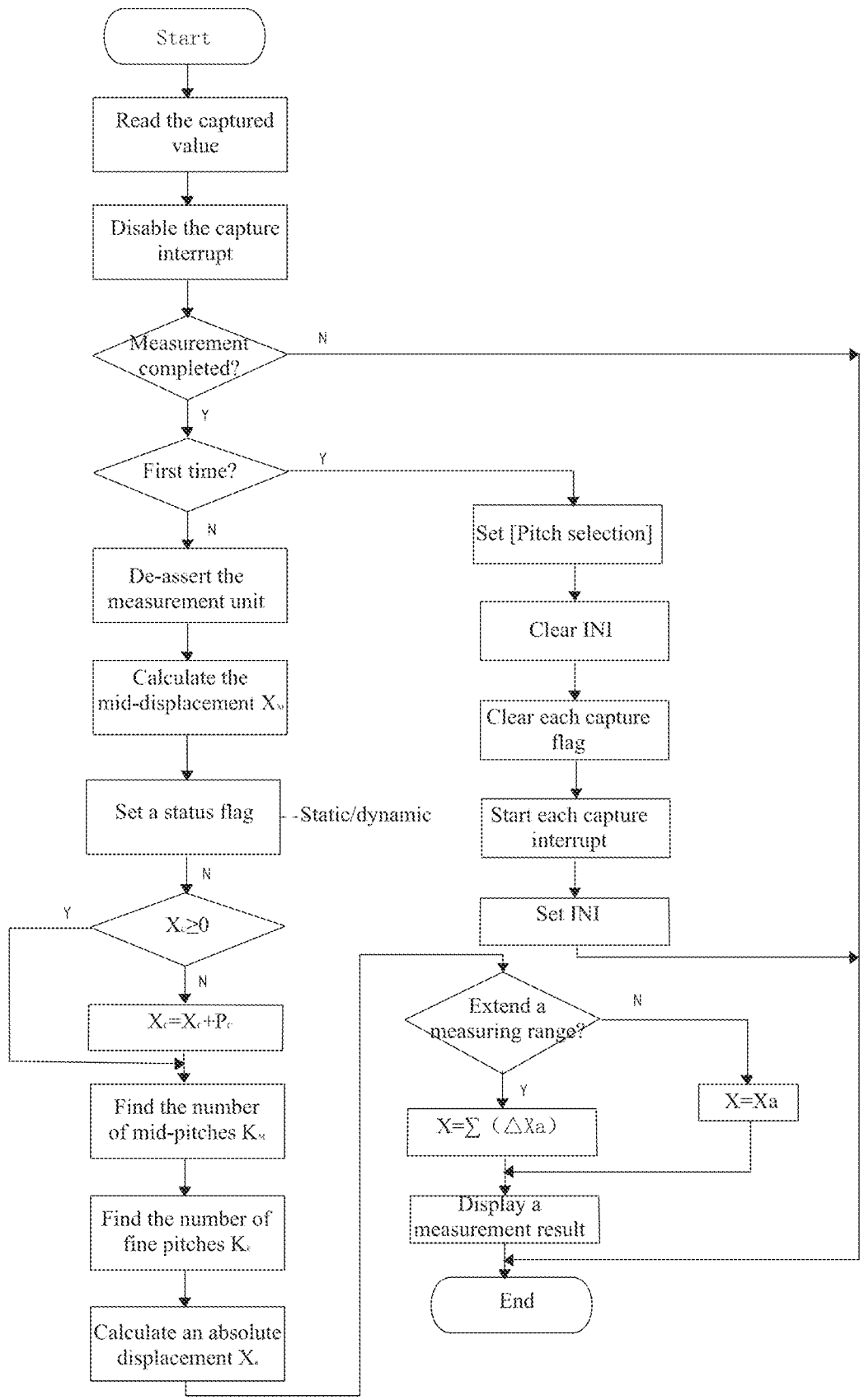
FIG. 16 is a flowchart of capture interrupt processing when a 3-pitch structure is used according to the present disclosure.

The processing flow of capture interruption is shown in FIG. 16. A capture value of the interrupt source is read, and an interrupt request of the capture is disabled; if the first measurement is completed: set the [pitch selection] signal, clear the initializing signal INI to 0, clear each capture interrupt request flag, and reopen each capture interrupt request, initiate a second measurement after setting the initializing signal INI; if the second measurement is completed: disable the measurement unit, calculate the mid-displacement $x_M=m\cdot(N_{12}-N_{11})$; determine whether the sensor is moving and set the status flag, calculate the coarse displacement $x_C=m\cdot n\cdot(N_{23}-N_{21})$; map the coarse displacement $x_C$ to the semi-closed interval [0, $P_C$); replace the total displacement $x_T$ with the coarse displacement $x_C$ to figure out, according to the relational expression (i), the integer number $K_M$ of mid-pitches included in the coarse displacement $x_C$; figure out, according to the relational expression (j), the integer number $K_F$ of fine pitches included in the mid-displacement $x_M$; calculate an absolute displacement $x_a$ of the measured position within the coarse pitch $P_C$ according to the formula (k); accumulate the absolute displacement increment $\Delta x_a$ if the range is required to be extended, and finally display a measurement result based on user requirements.

A 3-pitch structure may also be used to measure angular displacement. However, because the angular displacement is required to be absolutely positioned only within 360°, in general, the 2-pitch structure may meet the requirements, so details are not described herein again.

The foregoing embodiments are only specific examples to further describe the purpose, technical solutions, and beneficial effects of the present disclosure, but are not limited in the present disclosure. Any modification, equivalent replacement, improvement made within the scope of the disclosure of the present disclosure are all included in the protection scope of the present disclosure.

What is claimed is:

1. A hybrid positioning electromagnetic induction displacement sensor, the sensor comprising a transceiver board (1) and an excitation board (2) that may move relative to each other along a measuring path, wherein the transceiver board (1) is arranged with a measurement circuit and at least one transmitter winding extending along the measuring path, each transmitter winding respectively encircles a first pitch three-phase receiver winding and a second pitch three-phase receiver winding by using two approximately closed rectangular coils in the same direction in series, each three-phase receiver winding comprises three phase windings with the same structure and a phase difference of 120° in sequence, both the transmitter winding and the three-phase receiver winding being connected to the measurement circuit; the measurement circuit comprises a central control unit, an interface unit, and a measurement unit, the central control unit comprising a microcontroller (13), and the interface unit comprising a key input circuit, a liquid crystal drive circuit, a measurement interface circuit, and a power source conversion circuit that are connected to the microcontroller (13); and the excitation board (2) is arranged with at least two rows of excitation coils that extend along the measuring path, wherein the number of the at least two rows of excitation coils arranged on the excitation board is equal to that of the three-phase receiver windings on the transceiver board (1), each row of excitation coil and a corresponding three-phase receiver winding on the transceiver board (1) have the same pitch and coincided center lines respectively, and a length of each of the excitation coils and a length of a three-phase receivers winding along the measuring path is half of a respective pitch;

wherein the measurement unit comprises an oscillator, a frequency dividing circuit (3), a signal generator consisting of a driving and sampling pulse forming circuit (4) and a line voltage scanning control signal generator (5), an analog signal processing circuit consisting of an analog switch group (6), sample-and-hold capacitors ($C_1$, $C_2$), a differential amplifier (7), a low-pass filter (8), and a zero-crossing detector (9), a phase quantization circuit consisting of a synchronous delay circuit, an up counter (10), random access memories (11, 12) and a synchronous capture circuit, and transmitter winding drive power tubes ($T_1$, $T_2$), two sets of analog signal processing circuits, random access memories, and synchronous capture circuits being respectively arranged to form two parallel processing channels; and the oscillator provides an input clock for the driving and sampling pulse forming circuit (4), the line voltage scanning control signal generator (5), the low-pass filter (8), the synchronous capture circuit and the up counter (10) directly or through the frequency dividing circuit (3): in addition to connecting to the analog switch group (6), the driving and sampling pulse forming circuit (4) is connected to the transmitter winding drive power tubes ($T_1$, $T_2$) directly or through a multi-way switch ($S_{14}$), and the line voltage scanning control signal generator (5) is separately connected to the analog switch group (6) and the synchronous delay circuit: the analog switch group (6), the differential amplifier (7), the low-pass filter (8), the zero-crossing detector (9), the synchronous capture circuit are connected in sequence, and the sample-and-hold capacitors ($C_1$, $C_2$) are connected between an input end of the differential amplifier (7) and the analog signal ground: the synchronous delay circuit is separately connected to the synchronous capture circuit and the up counter (10), and the up counter (10) and the synchronous capture circuit are respectively connected to the random access memories (11, 12): each transmitter winding is connected to a power source through respective driving power tube ($T_1$ or $T_2$), and each three-phase receiver winding is connected to the analog signal ground in a star-shaped (Y) joint and neutral point.

2. The hybrid positioning electromagnetic induction displacement sensor according to claim 1, wherein each transmitter winding respectively encircles two three-phase receiver windings with different pitches by using two approximately closed coils in the same direction in series; all excitation coils are in the shape of a short-circuit loop; each phase receiver winding consists of M, which is at least 2, sub-windings of a same structure that are phase-shifted in space by 60°/M, connected in series to form a distributed winding, each sub-winding forming the distributed winding may be a distributed winding; each time measuring, in parallel, a spatial phase or displacement of a measured position in two different pitches encircled by the same transmitter winding; after measuring the spatial phase or displacement of the measured position in a required different pitches, the microcontroller (13) de-asserts the measurement unit from running, and calculates a measured displacement by using a hybrid positioning or absolute positioning algorithm.

3. The hybrid positioning electromagnetic induction displacement sensor according to claim 1, wherein the transceiver board (1) and the excitation board (2) may move relative to each other along a measurement axis; the transceiver board (1) is arranged with a transmitter winding (1.3) extending along the measurement axis and two three-phase receiver windings (1.1, 1.2) with different pitches; the transmitter winding (1.3) separately encircles the three-phase receiver winding (1.1) with a pitch of $P_1$ and the three-phase receiver winding (1.2) with a pitch of $P_2$ by using two approximately closed rectangular coils (1.3.1, 1.3.2) in the same direction in series; and the excitation board (2) is arranged with two rows of excitation coils (2.1, 2.2) extending along the measurement axis, the two rows of excitation coils and the two three-phase receiver windings (1.1, 1.2) on the transceiver board (1) having the same pitch and coincided center lines respectively, and a shape of the excitation coil is a rounded rectangular short-circuit loop; and a spatial frequency difference between the pitches $P_2$ and $P_1$ is taken as a mid-pitch spatial frequency $F_M=1/P_2-1/P_1$, to obtain a mid-pitch $P_M=1/F_M=P_1 \cdot P_2/(P_1-P_2)=m \cdot P_1=(m+1) \cdot P_2$ with a wavelength ratio of m.

4. The hybrid positioning electromagnetic induction displacement sensor according to claim 1, wherein the transceiver board (1) and the excitation board (2) may rotate relative to each other around a rotating shaft, and a pitch is calculated according to an angle; the transceiver board (1) is arranged with a transmitter winding (1.3) extending along a concentric arc and two three-phase receiver windings (1.1, 1.2) with different pitches; the transmitter winding (1.3) separately encircles the three-phase receiver winding (1.1) with a pitch of $P_1$ and the three-phase receiver winding (1.2) with a pitch of $P_2$ by using two approximately closed concentric arc coils (1.3.1, 1.3.2) in the same direction in series; the excitation board (2) is arranged with two rows of excitation coils (2.1, 2.2) extending along a concentric circle, the two rows of excitation coils and the two three-phase receiver windings (1.1, 1.2) on the transceiver board (1) having the same pitch and coincided center lines respectively, and a shape of the excitation coil is a short-circuit loop formed by two concentric arcs and two radial straight lines; and a spatial frequency difference between the pitches $P_2$ and $P_1$ is taken as a mid-pitch spatial frequency $F_M=1/P_2-1/P_1$, to obtain a mid-pitch $P_M=1/F_M=P_1 \cdot P_2/(P_1-P_2)=m \cdot P_1=(m+1) \cdot P_2$ with a wavelength ratio of m.

5. The hybrid positioning electromagnetic induction displacement sensor according to claim 1, wherein the transceiver board (1) and the excitation board (2) may move relative to each other along a measurement axis; the transceiver board (1) is arranged with two transmitter windings (1.4, 1.5) extending along the measurement axis and three three-phase receiver windings (1.1, 1.2, 1.3) with different pitches; the first transmitter winding (1.4) separately encircles the three-phase receiver winding (1.1) with a pitch of $P_1$ and the three-phase receiver winding (1.2) with a pitch of $P_2$ by using two approximately closed rectangular coils (1.4.1, 1.4.2) in the same direction in series; the second transmitter winding (1.5) separately encircles the three-phase receiver winding (1.1) with a pitch of $P_1$ and the three-phase receiver winding (1.3) with a pitch of $P_3$ by using two approximately closed rectangular coils (1.4.1, 1.5.2) in the same direction in series; and the excitation board (2) is arranged with three rows of excitation coils (2.1, 2.2, 2.3) extending along the measurement axis, the three rows of excitation coils and the three three-phase receiver windings (1.1, 1.2, 1.3) on the transceiver board (1) having the same pitch and coincided center lines respectively, and a shape of the excitation coil is a rounded rectangular short-circuit loop; and a spatial frequency difference between the pitches $P_2$ and $P_1$ is taken as a mid-pitch spatial frequency $F_M=1/P_2-1/P_1$, to obtain a mid-pitch $P_M=1/F_M=P_1 \cdot P_2/(P_1-P_2)=m \cdot P_1=(m+1) \cdot P_2$ with a wavelength ratio of m; and a spatial frequency difference between the pitches $P_3$ and $P_1$ is taken as a coarse-pitch spatial frequency $F_C=1/P_3-1/P_1$, to obtain a coarse pitch $P_C=1/F_C=P_1 \cdot P_3/(P_1-P_3)=m \cdot n \cdot P_1=(m \cdot n+1) \cdot P_3$ with a wavelength ratio of n.

6. The hybrid positioning electromagnetic induction displacement sensor according to claim 1, comprising a driving and sampling pulse forming circuit (4) comprising an odd number of cascaded phase inverters and an NAND gate ($G_{NA}$); a first clock signal ($S_{CLK}$) output by the frequency dividing circuit (3) is used as a trigger pulse of the circuit to separately connect to an input terminal of a first phase inverter and an input terminal of the NAND gate ($G_{NA}$), output of the odd number of cascaded phase inverters is connected to another input terminal of the NAND gate ($G_{NA}$), at each rising edge of the trigger pulse ($S_{CLK}$), the NAND gate ($G_{NA}$) outputs a negative narrow pulse, a width of the negative narrow pulse being equal to a total transmission delay of the odd number of cascaded phase inverters; inverting an output (Y) of the NAND gate ($G_{NA}$) to obtain a positive sample-and-hold control signal (SAH), and inverting and buffering the output (Y) of the NAND gate ($G_{NA}$) to obtain a positive drive signal (TG); and a line voltage scanning control signal generator (5) consisting of 4 D-type flip-flops ($FF_{11}$, $FF_{12}$, $FF_{13}$, $FF_{14}$); a second clock signal ($P_{CLK}$) output by the frequency dividing circuit (3) is separately connected to clock terminals of the 4 D-type flip-flops, and an initializing signal (INI) output by the microcontroller (13) presets the four D-type flip-flops to 1, 0, 0, and 1, respectively; first three D-type flip-flops ($FF_{11}$, $FF_{12}$, $FF_{13}$) form a cyclic shift circular counter, and three signals ($Q_0$, $Q_1$, $Q_2$) output by the first three D-type flip-flops are high electrical levels in turn; a fourth D-type flip-flop ($FF_{14}$) counts output ($Q_0$) of a first D-type flip-flop ($FF_{11}$), and each cycle of the circular counter makes its output ($Q_3$) flip once.

7. The hybrid positioning electromagnetic induction displacement sensor according to claim 1, comprising an analog switch group (6) forming a three-stage switch series structure, and completes selection, exchanging and sampling of a phrase voltage for an input three-phase voltage sequentially: first-stage switches ($S_1$-$S_6$) are configured as three pairs: $\{S_1, S_4\}$, $\{S_2, S_5\}$ and $\{S_3, S_6\}$, which respectively select phase voltage pairs $\{u_A, u_B\}$, $\{u_A, u_C\}$ and $\{u_B, u_C\}$; second-stage switches ($S_7$-$S_8$) exchange, as required, a sequence of the phase voltage pairs selected by the first-stage switches; third-stage switches ($S_9$-$S_{10}$) sample a pair of phase voltages output by the second-stage switches, and save results in the sample-and-hold capacitors ($C_1$, $C_2$) respectively; and a differential amplifier (7) performing a subtraction operation and amplification on two phase voltage samples saved in the sample-and-hold capacitors ($C_1$, $C_2$), to obtain a corresponding line voltage sample and zero-order hold signal; under the control of an output signal of the signal generator, a line voltage cyclic scanning sampling in the order of A-B, A-C, B-C, B-A, C-A, C-B is obtained sequentially, and input three-phase voltage that does not change with time (when the sensor is not moving), but changes periodically with a measured position, of the three-phase receiver winding is synthesized into a discrete time sinusoidal signal ($u_s(n)$), and a spatial phase of the measured position within the pitch of the three-phase receiver winding is converted into an initial phase of the discrete time sinusoidal signal ($u_s(n)$).

8. The hybrid positioning electromagnetic induction displacement sensor according to claim 1, comprising a synchronous delay circuit consisting of 3 D-type flip-flops ($FF_{21}$, $FF_{22}$, $FF_{23}$); a last output signal ($Q_3$) of the line voltage scanning control signal generator (5) connected to a clock end of a first D-type flip-flop ($FF_{21}$) is used as an input clock of the circuit, an initializing signal (INI) output by the microcontroller (13) presets the three D-type flip-flops to 1, 1, and 0, respectively, such that an output signal ($C_E$) is in a low electrical level; first two D-type flip-flops ($FF_{21}$, $FF_{22}$) form a 2-bit asynchronous subtraction counter to count down a rising edge of an input clock ($Q_3$); and when a rising edge of a fourth input clock ($Q_3$) arrives, the output signal ($C_E$) jumps to a high electrical level;

after the output signal ($C_E$) of the synchronous delay circuit jumps to the high electrical level, the up counter (10) starts counting from 0, and the synchronous capture circuit removes capture blockade; and a synchronous capture circuit consisting of two D-type flip-flops ($FF_{31}$, $FF_{32}$) and an AND gate ($AG_{31}$); the initializing signal (INI) output by the microcontroller (13) asynchronously clears two D-type flip-flops ($FF_{31}$, $FF_{32}$) to 0, and blocks capture of the counting value of the up counter (10) before a delay time; the output signal ($C_E$) of the synchronous delay circuit jumps to the high electrical level at the delay time, a square wave signal ($U_Z$) output by the analog signal processing circuit sets an output signal ($C_S$) of the first D-type flip-flop ($FF_{31}$) to the high electrical level at a first rising edge afterwards, and an output signal ($C_P$) of the AND gate ($AG_{31}$) has been the same as the square wave signal ($U_Z$) since then; after synchronizing the output signal ($C_P$) of the AND gate ($AG_{31}$) with a falling edge of a system clock, the second D-type flip-flop ($FF_{32}$) separately captures the counting value of the up counter (10) in a synchronized manner on the rising edge and the falling edge of the square wave signal ($U_Z$), which are respectively stored in two random access memories (11, 12), to obtain a quantization code of the spatial phase or displacement of the measured position within the pitch of the three-phase receiver winding connected to the processing channel.

9. The hybrid positioning electromagnetic induction displacement sensor according to claim 1, wherein:

after measuring, in parallel, phase quantization codes $N_1$ and $N_2$ with a measured position within two different pitches $P_1$ and $P_2$ encircled by a transmitter winding (1.3), a fine displacement $x_F=N_1$ (a pitch $P_1$ is correspondingly referred to as a fine pitch $P_F$), a mid-displacement $x_M=m \cdot (N_2-N_1)$, and mid-displacement increments $\Delta x_M$ in two consecutive measurements are accumulated to obtain a total displacement $x_T=\Sigma(\Delta x_M)$, an integer number $K_M$ of mid-pitches contained in the total displacement $x_T$ is figured out according to a relationship $x_T \approx K_M \cdot P_M+x_M$, an integer number $K_F$ of fine pitches contained in the mid-displacement $x_M$ is figured out according to a relationship $x_M \approx K_F \cdot P_F+x_F$, and a measured displacement x without range limit is obtained according to a formula $x=(m \cdot K_M+K_F) \cdot P_F+x_F$; the following absolute positioning algorithm may also be used to map the mid-displacement $x_M$ to a half-closed interval $[0, P_M)$, an integer number $K_F$ of fine pitches contained in the mid-displacement $x_M$ is figured out according to a relationship $x_M \approx K_F \cdot P_F+x_F$, and a measured displacement x absolute positioned within the mid-pitch is obtained according to a formula $x=K_F \cdot P_F+x_F$; and after measuring, in parallel, phase quantization codes $N_{11}$ and $N_{12}$ with a measured position within two different pitches $P_1$ and $P_2$ encircled by a first transmitter winding (1.4), and measuring, in parallel, phase quantization codes $N_{21}$ and $N_{23}$ with a measured position within two different pitches $P_1$ and $P_3$ encircled by a second transmitter winding (1.5), a fine displacement $x_F=N_{21}$ (a pitch $P_1$ is correspondingly referred to as a fine pitch $P_F$), a mid-displacement $x_M=m \cdot (N_{12}-N_{11})$, a coarse displacement $x_C=m \cdot n \cdot (N_{23}-N_{21})$, the coarse displacement $x_C$ is mapped to a half-closed interval $[0, P_C)$, an integer number $K_M$ of mid-pitches $P_M$ contained in the coarse displacement $x_C$ is figured out according to a relationship $x_C \approx K_M \cdot P_M+x_M$, an integer number $K_F$ of fine pitches $P_F$ contained in the mid-displacement $x_M$ is figured out according to a relationship $x_M \approx K_F \cdot P_F+x_F$, an absolute displacement $x_a$ within the coarse pitch is obtained according to a formula $x_a=(m \cdot K_M+K_F) \cdot P_F+x_F$, if a measuring range is not extended, the measured displacement $x=x_a$, or a measured displacement $x=\Sigma(\Delta x_a)$ without range limit is obtained by accumulating absolute displacement increments $\Delta x_a$ in two consecutive measurements.

* * * * *